(12) United States Patent
Ebuchi et al.

(10) Patent No.: US 8,463,476 B2
(45) Date of Patent: Jun. 11, 2013

(54) HYBRID VEHICLE CONTROL APPARATUS

(75) Inventors: Hiroaki Ebuchi, Susono (JP); Hideaki Komada, Gotemba (JP); Michinobu Suzuki, Susono (JP); Tomohito Ono, Susono (JP); Hirotatsu Kitabatake, Susono (JP); Kensei Hata, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 298 days.

(21) Appl. No.: 13/060,220

(22) PCT Filed: Nov. 30, 2009

(86) PCT No.: PCT/JP2009/070130
§ 371 (c)(1),
(2), (4) Date: Feb. 22, 2011

(87) PCT Pub. No.: WO2011/064890
PCT Pub. Date: Jun. 3, 2011

(65) Prior Publication Data
US 2011/0231043 A1 Sep. 22, 2011

(51) Int. Cl.
*B60W 20/00* (2006.01)
*G06F 19/00* (2006.01)
(52) U.S. Cl.
USPC .......................................... 701/22; 180/65.21
(58) Field of Classification Search
USPC 701/22; 180/65.21, 65.265, 65.285; 903/930, 903/945; 60/705
See application file for complete search history.

(56) References Cited

U.S. PATENT DOCUMENTS

| | | | | |
|---|---|---|---|---|
| 5,513,719 A | * | 5/1996 | Moroto et al. | 180/65.21 |
| 6,067,801 A | * | 5/2000 | Harada et al. | 60/705 |
| 2008/0004780 A1 | | 1/2008 | Watanabe et al. | |
| 2010/0286858 A1 | * | 11/2010 | Otokawa | 701/22 |
| 2011/0213524 A1 | * | 9/2011 | Matsumoto | 701/22 |

FOREIGN PATENT DOCUMENTS

| | | |
|---|---|---|
| JP | 2004-328824 A | 11/2004 |
| JP | 2008-006945 A | 1/2008 |

* cited by examiner

*Primary Examiner* — Tan Q Nguyen
(74) *Attorney, Agent, or Firm* — Sughrue Mion, PLLC

(57) ABSTRACT

A hybrid vehicle control apparatus (1) provided with: an internal combustion engine (200); a rotating electrical machine (MG2); and a power transmission mechanism (300) which is provided with a plurality of rotational elements each having a play in its rotational direction and which can transmit a torque between a drive shaft coupled with an axle and the internal combustion engine or the rotating electrical machine, the hybrid vehicle control apparatus including: a judging device (100) for judging whether or not an input/output torque of the rotating electrical machine to the drive shaft crosses an avoidance area, which is set as generating a rattle caused by the play in the power transmission mechanism in a process that the input/output torque converges to a target torque; and a reducing device (100) for reducing a crossover time as a time required for the input/output torque crossing the avoidance area in a case where the input/output torque is judged to cross the avoidance area, with respect to a reference time as a time required for the input/output torque crossing a torque area corresponding to the avoidance area in a case where the input/output torque does not cross the avoidance area.

7 Claims, 11 Drawing Sheets

(a)

(b)

HYBRID VEHICLE CONTROL APPARATUS

TECHNICAL FIELD

The present invention relates to a hybrid vehicle control apparatus for controlling a hybrid vehicle provided with a power transmission mechanism including a rotational element having a play in its rotational direction between an internal combustion engine, a rotating electrical machine, and a drive shaft.

BACKGROUND ART

As this type of apparatus, there has been suggested an apparatus for suppressing the occurrence of a rattle in accordance with SOC (State of Charge) of a battery (e.g. refer to a patent document 1). According to the apparatus disclosed in the patent document 1, in a case where the rattle occurs, the rattle is supposedly suppressed by reducing engine output and performing the power running drive of a motor generator on a drive side if there is room for the SOC, and by increasing the engine output and performing the regenerative drive of the motor generator on the drive side if there is no room for the SOC.

Incidentally, there has been also suggested an apparatus for controlling the motor generator as a reaction element, so as to depart from a rattle occurrence condition if the input/output toque of a motor is in a rattle occurrence area in a case where an engine start request or stop request is detected (e.g. refer to a patent document 2).

PRIOR ART DOCUMENT

Patent Document

Patent document 1: Japanese Patent Application Laid Open No. 2004-328824
Patent document 2: Japanese Patent Application Laid Open No. 2008-006945

DISCLOSURE OF INVENTION

Subject to be Solved by the Invention

In the apparatus disclosed in the patent document described above, the rattle is suppressed by setting the input/output torque of the motor to be outside the rattle occurrence area in the case where the rattle occurs in the course of system control. However, there is no discussion about how to control the input/output torque of the motor in a case where the input/output torque of the motor crosses the rattle occurrence area in the patent document described above. Therefore, even if it is avoided that the input/output torque of the motor remains in the rattle occurrence area, there is a possibility that a noise or vibration is not always sufficiently reduced in the period that the input/output torque crosses the rattle occurrence area. In particular, in the hybrid vehicle or the like in which the drive condition of the motor is determined such that the internal combustion engine has a good fuel consumption rate, the frequency that the input/output torque of the motor crosses the rattle occurrence area is not small. Such a vibration and noise can be a factor to reduce the drivability of the hybrid vehicle. In other words, in the conventional control including the control disclosed in the patent documents described above, the reduction in drivability of the hybrid vehicle is not necessarily sufficiently suppressed, which is technically problematic.

In view of the aforementioned problems, it is therefore an object of the present invention to provide a hybrid vehicle control apparatus capable of suppressing the reduction in drivability caused by the rattle.

Means for Solving the Subject

The above object of the present invention can be achieved by a hybrid vehicle control apparatus provided with: an internal combustion engine; a rotating electrical machine; a storage battery device which can supply an electric power to the rotating electrical machine and which can be charged by a regenerative electric power of the rotating electrical machine; and a power transmission mechanism which is provided with a plurality of rotational elements each having a play in its rotational direction and which can transmit a torque between a drive shaft coupled with an axle and the internal combustion engine or the rotating electrical machine, the hybrid vehicle control apparatus including: a judging device for judging whether or not an input/output torque of the rotating electrical machine to the drive shaft crosses an avoidance area, which is set as generating a rattle caused by the play in the power transmission mechanism in a process that the input/output torque converges to a target torque; and a reducing device for reducing a crossover time as a time required for the input/output torque crossing the avoidance area in a case where the input/output torque is judged to cross the avoidance area, with respect to a reference time as a time required for the input/output torque crossing a torque area corresponding to the avoidance area in a case where the input/output torque does not cross the avoidance area.

The hybrid vehicle control apparatus of the present invention is provided with: the internal combustion engine as an engine capable of generating power by the combustion of fuel, which can adopt various aspects regardless of its physical, mechanical or electrical configuration, such as a fuel type, the supply aspect of the fuel, the combustion aspect of the fuel, the structures of intake and exhaust systems, and cylinder arrangement, as a power element which can supply the power to the drive shaft; and the rotating electrical machine such as various motor generators capable of performing power running and electric power generation (i.e. electric power regeneration). The rotating electrical machine can regenerate the input torque as the electric power, for example, in a positive rotation area, in a case where the power is inputted in a power transmission pathway via the drive shaft, the axle and the drive shaft in order (i.e. in a case where it is a negative torque) or in similar cases. Moreover, for example, the rotating electrical machine can receive at least one portion of a drive-shaft torque as the torque supplied to the drive shaft, by supplying a positive torque to the drive shaft in the positive rotation area. In other words, the rotating electrical machine of the present invention can input and output the torque to and from the drive shaft.

Moreover, the hybrid vehicle of the present invention is provided with: the internal combustion engine and the rotating electrical machine as the power elements; and the power transmission mechanism which can perform torque transmission with the drive shaft directly connected to or indirectly coupled with the axle via various gear mechanism. The power transmission mechanism has the plurality of rotational elements (preferably, gears), and each of the plurality of rotational elements has the play such as a backlash in its rotational direction.

Incidentally, the rotational elements which constitute the power transmission mechanism may include a first rotational element, a second rotational element coupled with the drive shaft, and a third rotational element coupled with the internal combustion engine, as a preferred one form, and they may be able to perform a differential operation on each other. In this case, the differential operation allows the torque transmission between the power elements and the drive shaft according to the state of each rotational element (plainly speaking, which includes whether or not it is rotatable and whether or not it is coupled with another rotational element or fixed element, and the like). Moreover, in this case, the power transmission mechanism can be provided with one or more various differential gear mechanisms such as a planetary gear mechanism. If it includes a plurality of planetary gear mechanisms, one portion of the rotational elements which constitute each planetary gear mechanism can be shared among the plurality of planetary gear mechanisms, as occasion demands.

Moreover, if the power transmission mechanism is established as a type of differential mechanism as described above, the hybrid vehicle may be also provided with another rotating electrical machine in addition to the rotating electrical machine of the present invention. The other rotating electrical machine may function as a reaction element which gives a reaction torque to the internal combustion engine. In this case, due to the other rotating electrical machine, the operating point of the internal combustion engine can be continuously variable at least in a predetermined range. Moreover, in this case, one portion of the engine torque of the internal combustion engine is used for the electric power regeneration (electric power generation) by the other rotating electrical machine, and another portion, i.e., a direct torque corresponding to the reaction torque given by the other rotating electrical machine is transmitted to the drive shaft. The drive-shaft torque may be defined by the direct torque and the input/output torque between the drive shaft and the rotating electrical machine of the present invention (the input/output torque corresponds to the electric power regeneration).

Incidentally, in the structure that the plurality of rotational machines are provided, it is not always necessary that only one rotating electrical machine functions as the reaction element. Depending on the structures of the rotational elements of the power transmission mechanism, one of the plurality of rotating electrical machines can be selectively made function as the reaction element or drive element, and the remaining other can be made function as the drive element or reaction element. In this structure, the rotating electrical machine of the present invention can mean a rotating electrical machine on the side that it functions as the drive element at the time point.

The hybrid vehicle control apparatus of the present invention is a control apparatus for controlling such a hybrid vehicle, and it can adopt a form of various computer systems such as various controllers or microcomputer apparatuses, various processing units such as a single or a plurality of ECUs (Electronic Controlled Unit), which can appropriately include one or more CPUs (Central Processing Unit), MPUs (Micro Processing Unit), various processors or various controllers, or various memory devices such as a ROM (Read Only Memory), a RAM (Random Access Memory), a buffer memory or a flash memory, and the like.

Here, the power transmission mechanism is disposed in the power transmission pathway between the internal combustion engine and the drive shaft, so that the power transmission mechanism is exposed to various scales of physical vibration with the internal combustion engine as an excitation source. Each of the rotational elements of the power transmission mechanism has the play such as a backlash in the rotational direction. Thus, if the rotational elements are vibrated in a range corresponding to the plays due to the physical vibration or in similar cases, the rattle may occur which is hard to be ignored in practice in the power transmission mechanism (plainly speaking, to the extent that a driver can perceive it as a noise). The rattle can be a factor to remarkably reduce the drivability of the vehicle.

Here, in particular, if the input/output torque of the rotating electrical machine of the present invention (i.e. the rotating electrical machine as the drive element) is low enough to cause this type of rattle (i.e. not high enough to suppress the vibration which causes the rattle), mainly the rotational element near the rotating electrical machine (which is, of course, not limited to near the rotating electrical machine but may be various in accordance with the structure of the power transmission mechanism) or the like vibrates in the range of the play and likely causes this type of rattle. In the present invention, the range of the input/output torque of the rotating electrical machine which can cause the rattle is referred to as the "avoidance area". The avoidance area is preferably an area which crosses or covers a positive torque side and a negative torque side between which there is a zero torque.

On the other hand, in terms of practical operation side, for example, if the rotating electrical machine is made function as an auxiliary power element or in similar cases, the target torque as the target value of the input/output torque of the rotating electrical machine can be set in accordance with a magnitude relation or the like between a driver request torque as the required value of the drive-shaft torque and the engine torque of the internal combustion engine (or the direct torque as a component acting on the driver shaft out of the engine torque). For example, if the direct torque is lower than the driver request torque, the positive torque (meaning discharge) can be set as the target torque, and if the direct torque is higher than the driver request torque, the negative torque (meaning electric power generation) can be set as the target torque.

Therefore, in the hybrid vehicle, it is not uncommon that the input/output torque crosses the avoidance area in a convergence process that the input/output torque converges to the target torque. Here, the statement that "the input/output torque crosses the avoidance area" means that the input/output torque passes through the avoidance area from one of the torque areas on the positive and negative sides between which there is the avoidance area. For example, it can happen by setting the target torque in the other torque area if the input/output torque is in the one torque area, or the like. In a crossover period in which the input/output torque crosses the avoidance area, the occurrence of the rattle is hardly avoided in terms of the structure of the power transmission mechanism. Thus, if no measure is taken, the drivability of the hybrid vehicle is easily reduced due to the rattle.

Thus, in the hybrid vehicle control apparatus, the reduction in drivability by the rattle is suppressed as described below.

That is, according to the hybrid vehicle control apparatus of the present invention, in its operation, firstly, the judging device judges whether or not the input/output torque of the rotating electrical machine to the drive shaft crosses the avoidance area in the process that the input/output torque converges to the target torque. At this time, the judging device can perform the judgment, for example, on the basis of the driver request torque at the time point, the quantity of state corresponding to a storage state of the storage battery device (preferably, indicating SOC (State of Charge) as the quantitative index of the storage state defined as a fully charge state of 100(%) and a fully discharge state of 0(%) (Incidentally, the SOC is also used as a term meaning the storage state itself)), or an adjustment torque required at the time of a change in a speed change mode (plainly speaking, a torque for compensating a change in the direct torque when the reaction torque is changed), or the like.

According to the hybrid vehicle control apparatus of the present invention, the reducing device reduces the crossover time as a time required for the input/output torque actually crossing the avoidance area in a case where the input/output torque of the rotating electrical machine is judged to cross the avoidance area by the judging device. The rattle occurs in the crossover time. Thus, by reducing the crossover time, the occurrence period of the rattle is reduced, and an influence by the rattle is eased. In other words, it is possible to suppress the reduction in drivability.

Here, the "reference time" which provides a reference in reducing the crossover time is a time required for the input/output torque crossing the torque area corresponding to the avoidance area in the case where the input/output torque does not cross the avoidance area. It is, so to speak, a time required when the input/output torque crosses the avoidance area under the normal control aspect.

In other words, what the reducing device means is to predict that the input/output torque crosses the avoidance area, to temporarily cancel such a basic convergence control that the input/output torque is made converge to the original target torque set on the basis of a predetermined standard developed in advance (e.g. a control logic for maintaining the aforementioned quantity of state of the storage battery device at a reference value, a control logic for maximizing the system efficiency of the hybrid vehicle, or a control logic for matching a sum of the direct component of the engine torque of the internal combustion engine and the input/output torque of the rotating electrical machine with the driver request torque, or the like) in the crossover period in which the input/output torque crosses the avoidance area (the crossover time means a time length of the crossover period), and to apply special torque control specified in the case where the input/output torque crosses the avoidance area. Therefore, as long as the actual crossover time can be reduced to some degree with respect to the time (or reference time) required when the reducing device does not reduce the crossover time, its practical aspect is, in effect, not limited to any manner.

Incidentally, even for the reference time, of course, there is a control standard for defining the reference time, and the reference time is time with a rationality (to put it differently, if a time for convergence to the target torque is set to be extremely short with respect to the input/output torque in the torque area which does not cross the avoidance area, for example, the fluctuation level of the input/output torque increases and causes a sense of discomfort such as a torque shock, so that it is unreasonable). For example, if the input/output torque of the rotating electrical machine is controlled by torque feedback control or the like based on a deviation between the target torque and the input/output torque at the current time point (wherein the target torque can be also set in accordance with various standards, such as the aforementioned quantity of state of the storage battery device), the drive conditions of the rotating electrical machine are determined in accordance with various control items such as a feedback gain associated with the torque feedback, and, inevitably, a time required to reach the target torque can be determined to some degree. This time can be the reference time. In this case, if a temporal target torque is set on the side that a torque deviation increases more than the original target torque, or if the feedback gain is corrected such that the input/output torque converges to the target torque at an earlier time, or in similar cases, then, there is obtained the effect that the crossover time is reduced clearly with respect to the reference time.

In one aspect of the hybrid vehicle control apparatus of the present invention, it is further provided with a controlling device for cooperatively controlling the input/output torque and an engine torque supplied from the internal combustion engine so as to maintain a driver request torque required for the drive shaft.

According to this aspect, by the operation of the controlling device, ideally, a sum of the engine torque and the input/output torque matches the driver request torque. Therefore, in performing the control of the input/output torque for the reducing device reducing the crossover time (e.g. control for correcting the engine torque of the internal combustion engine to a reduction side, for promoting the discharge from the storage battery device by increasing the output torque of the rotating electrical machine, for increasing a SOC deviation associated with a SOC feedback control, and the like if the input/output torque is in a positive torque area (i.e. if the original target torque is in a negative torque area)), the required value of the drive-shaft torque is maintained. Therefore, the drivability is ensured, more preferably.

In another aspect of the hybrid vehicle control apparatus of the present invention, the target torque is set in accordance with a reference deviation such that the magnitude of the reference deviation corresponds to the magnitude of the target torque, the reference deviation being a deviation between quantity of state corresponding to a storage state of the storage battery device and a reference value of the quantity of state, and the reducing device reduces the crossover time by temporarily stopping setting of the target torque according to the reference deviation and by maintaining the input/output torque in a torque area outside the avoidance area to increase the reference deviation.

According to this aspect, the target torque of the input/output torque is set in accordance with the reference deviation as the deviation between the quantity of state corresponding to the storage state of the storage battery device (preferably meaning the aforementioned SOC) and the reference value, and the feedback control of the quantity of state is performed. When reducing the crossover time, the reducing device temporarily stops the setting of the target torque according to the reference deviation, i.e. the feedback control of the quantity of state of the storage battery device, and it maintains the input/output torque in the torque area outside the avoidance area.

If the input/output torque is maintained in the torque area outside the avoidance area without crossing the avoidance area, the reference deviation increases which is the deviation from the original reference value. This increases the drive electric power of the rotating electrical machine when the feedback control of the quantity of state is restarted, and it reduces a time for the passage of the avoidance area. As described above, by using the feedback control of the quantity of state of the storage battery device, which is one portion of the existing control process, the control load of the reducing device is reduced.

Incidentally, the aspect of temporarily stopping the feedback control is not limited to one. For example, it may be substantially stopped by a measure such as provisionally setting the reference value to a value corresponding to the current quantity of state (i.e. setting the reference deviation to zero or substantially zero). Alternatively, the feedback control may be stopped.

Incidentally, further to this aspect, there is no crossover period as long as the input/output torque is maintained outside the avoidance area; namely, the crossover time is zero. Thus, the occurrence of the rattle is prevented.

Incidentally, in one aspect of the hybrid vehicle control apparatus in which the reference deviation is increased as described above, the reducing device restarts the setting of the target torque according to the reference deviation after the reference deviation increases.

According to this aspect, the feedback control of the quantity of state is restarted after the reference deviation increases. At this time, since the reference deviation increases, the target torque also tends to increase, and a convergence speed for making the input/output torque converge to the target torque (plainly speaking, the rate of change in torque) also increases. Thus, aside from the time required for the convergence, it is possible to reduce at least the crossover time required for the passage of the avoidance area.

Moreover, in this case, it is prevented that the quantity of state of the storage battery device considerably changes in one direction (i.e. in a direction of reducing or increasing the quantity of state). Thus, the quantity of state can be maintained in a desired range, which is useful in practice.

Incidentally, in this aspect, the reducing device may restart the setting of the target torque according to the reference deviation if the crossover time is less than a predetermined value in a case where the setting of the target torque according to the reference deviation is restarted.

In this case, it is possible to return to the normal control aspect as early as possible without influencing the drivability by taking a measure, such as setting a threshold value (predetermined value) of the crossover time on the basis of experiments, experiences, theories, or simulations in advance, such that an influence of the rattle on the drivability is included in a practically acceptable level.

In another aspect of the hybrid vehicle control apparatus of the present invention, the reducing device reduces a time for the input/output torque remaining in the avoidance area by repeatedly setting the target torque between a positive torque area and a negative torque area between which there is the avoidance area if the target torque is in the avoidance area, and the reducing device reduces the crossover time in crossing the avoidance area in a process that the input/output torque converges to the repeatedly set target torque.

Depending on the operational condition of the hybrid vehicle and the storage state of the storage battery device at the time point, the target torque of the rotating electrical machine can be set in the avoidance area in some cases. In this case, the steady-state value (convergence value) of the input/output torque of the rotating electrical machine is in the avoidance area, so that it is hard to fundamentally solve the problem associated wit the occurrence of the rattle, for example, even by temporarily setting the target torque outside the avoidance area.

According to this aspect, if the original target torque changes in the avoidance area, a provisional target torque is repeatedly set between the positive torque area and the negative torque area between which there is the avoidance area. Thus, the input/output torque changes from the positive torque side to the negative torque side, or from the negative toque side to the positive torque side in order while crossing the avoidance area. Here, the rattle does not occur in the period that the input/output torque is in the positive torque area or the negative torque area outside the avoidance area, so that the occurrence of the rattle is suppressed by only the relevant control, in comparison with a case where the input/output torque always remains in the avoidance area.

On the other hand, according to this aspect, there are measures associated with a reduction in the original crossover time, in addition to the reduction in such a retention time. In other words, in passing through the avoidance area in the process that the input/output torque changes from one torque area to another torque area outside the avoidance area, the crossover time is reduced by the reducing device. Therefore, even in a case where the original target torque is in the avoidance area, the reduction in drivability by the rattle is preferably suppressed.

Incidentally, by repeatedly reversing the sign of the input/output torque between the positive toque area and the negative torque area as described above, it is possible to include the storage state of the storage battery device in an acceptable range in which the hybrid vehicle can be operated without any problem in practice, and it is possible to suppress the reduction in drivability without bringing the storage battery device into a state of overcharge or over-discharge.

In another aspect of the hybrid vehicle control apparatus of the present invention, the hybrid vehicle is further provided with a locking device capable of selectively changing a state of one rotational element of the plurality of rotational elements between a non-rotatable lock state and a rotatable non-lock state, the hybrid vehicle can change a speed change mode between a stepless speed change mode and a fixed speed change mode, the stepless speed change mode corresponding to the non-lock state in which a transmission gear ratio which is a ratio between a rotational speed of the internal combustion engine and a rotational speed of the drive shaft is continuously variable, the fixed speed change mode corresponding to the lock state in which the transmission gear ratio is fixed, the judging device judges whether or not the input/output toque crosses the avoidance area during a change in the speed change mode, and the reducing device reduces the crossover time if it is judged that the input/output toque crosses the avoidance area during the change in the speed change mode.

According to this aspect, the hybrid vehicle of the present invention is provided with a locking mechanism. The locking mechanism is an apparatus capable of changing the state of one rotational element of the rotational elements provided for the power transmission mechanism between a non-rotatable lock state in which the rotational element is non-rotatably fixed to a predetermined fixed element by various physical, mechanical, electrical, or magnetic engagement forces (plainly speaking, e.g. a hydraulic engagement force, an electromagnetic engagement force, or the like) and a rotatable non-lock state as a state in which the influence of the engagement forces associated with the lock state is not received at least substantially. The locking mechanism can adopt various aspects, such as a wet multi-plate braking apparatus or clutch apparatus, an electromagnetic dog clutch apparatus or an electromagnetic cam-lock clutch apparatus.

Moreover, the hybrid vehicle of the present invention can selectively change the speed change mode between the stepless speed change mode and the fixed speed change mode by the operation of the locking mechanism. The fixed speed change mode is selected in the state that the rotational element as a lock target is locked, and the stepless speed change mode is selected in the state that the rotational element as the lock target is released (non-lock state).

More specifically, the stepless speed change mode may be defined as a speed change mode or the like which can continuously change (including a stepwise aspect as well as continuously in practice) the transmission gear ratio which is a ratio between the rotational speed of the internal combustion engine and the rotational speed of the drive shaft, substantially, theoretically or within physical, mechanical, mechanistic, or electrical limitations defined in advance, by making the rotating electrical machine of the reaction element function as a rotational speed control mechanism of the internal combustion engine, if the hybrid vehicle is provided with the plurality of rotating electrical machines as described above and if the power transmission mechanism is a 2 rotational degree of freedom differential mechanism.

In this case, as a preferred form, the operating point of the internal combustion engine (e.g. a point for defining one operational condition of the internal combustion engine defined by an engine rotational speed and a torque) is arbitrarily selected theoretically, substantially, or within some limitations. For example, the operating point can be controlled to an optimum fuel consumption operating point or the like at which a fuel consumption rate is minimal theoretically, substantially, or within some limitations or at which the system efficiency of the hybrid vehicle (e.g. an overall efficiency calculated on the basis of the transmission efficiency of the power transmission mechanism, the thermal efficiency of the internal combustion engine, or the like) is maximal theoretically, substantially, or within some limitations.

On the other hand, the fixed speed change mode is a speed change mode in which the transmission gear ratio is uniquely defined, realized by maintaining the rotational element as the lock target in the lock state in a case where the 2 rotational degree-of-freedom differential mechanism is considered in the same manner. In other words, if the rotational element is in the lock state, the rotational speed of the remaining rotation element is uniquely defined from the rotational speed (i.e. zero) of the lock-target rotational element and the rotational speed of the rotational element (or rotational element coupled with the drive shaft) which adopts a unique rotational state to a vehicle speed, and it is possible to make the rotational speed of the internal combustion engine converge to this uniquely defined value.

The situation that the input/output torque of the rotating electrical machine crosses the avoidance area can significantly occur at the time of the change in the speed change mode in which the driver request torque is relatively small. Moreover, the change in the speed change mode is accompanied by the physical operation of the locking mechanism, so that the change itself may be accompanied by a noise. Although the noise may change in the magnitude depending on the physical structure of the locking mechanism, basically, there is no change in that the noise occurs at the time of the change in the speed change mode. Therefore, the reduction in crossover time by the reducing device is effective at the time of the change in the speed change mode of this type.

The operation and other advantages of the present invention will become more apparent from the embodiments explained below.

BEST MODE FOR CARRYING OUT THE INVENTION

Figure 1:
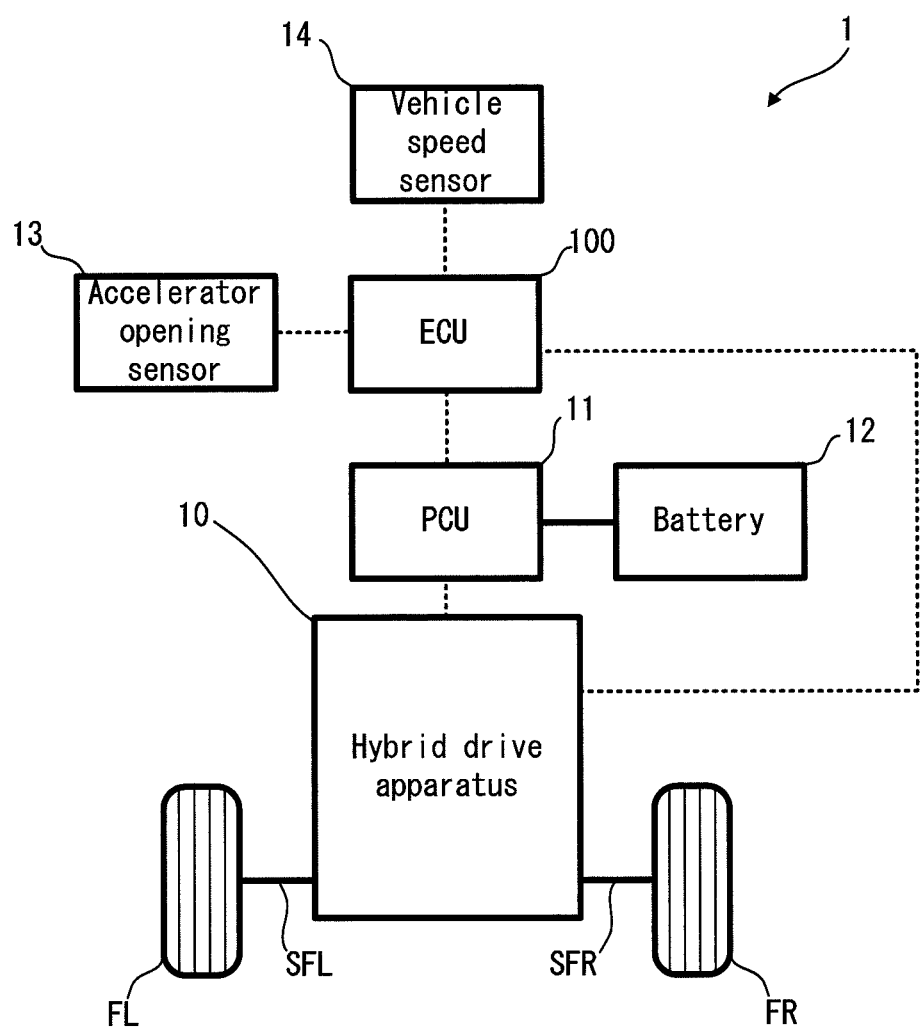
FIG. 1 is a schematic configuration diagram conceptually showing the structure of a hybrid vehicle in a first embodiment of the present invention.

<Embodiments of the Invention>
Hereinafter, the embodiments of the present invention will be explained with reference to the drawings.
<Structure of Embodiment>
Firstly, with reference to FIG. 1, an explanation will be given on the structure of a hybrid vehicle 1 in one embodiment of the present invention. FIG. 1 is a schematic configuration diagram conceptually showing the structure of the hybrid vehicle 1.

In FIG. 1, the hybrid vehicle 1 is one example of the "hybrid vehicle" of the present invention, provided with: an ECU 100; a PCU (Power Control Unit) 11; a battery 12; an accelerator opening sensor 13; a vehicle speed sensor 14; and a hybrid drive apparatus 10.

The ECU 100 is provided with a CPU (Central Processing Unit), a ROM (Read Only Memory), a RAM and the like. The ECU 100 is an electronic control unit which can control the operations of each part of the hybrid vehicle 1. The ECU 100 is one example of the "hybrid vehicle control apparatus" of the present invention. The ECU 100 can perform rattle suppression control described alter, in accordance with a control program stored in the ROM.

Incidentally, the ECU 100 is a unified or one-body electronic control unit which functions as one example of each of the "judging device", the "reducing device" and the "controlling device" of the present invention, and all the operations of each device are performed by the ECU 100. However, the physical, mechanical and electrical configurations of each of the devices of the present invention are not limited to this. For example, each of the devices may be constructed as various computer systems such as various controllers or microcomputer apparatuses, various processing units, a plurality of ECUs, and the like.

The hybrid drive apparatus 10 is a drive unit for driving the hybrid vehicle 1 by supplying a drive torque as a driving force to a left axle SFL (corresponding to a left front wheel FL) and a right axle SFR (corresponding to a right front wheel FR) as the axle of the hybrid vehicle 1. The detailed structure of the hybrid drive apparatus 10 will be described later.

The PCU 11 includes a not-illustrated inverter which can convert direct-current (DC) power extracted from the battery 12 to alternating-current (AC) power and supply it to a motor generator MG1 and a motor generator MG2 described later and to convert AC power generated by the motor generator MG1 and the motor generator MG2 to DC power and supply it to the battery 12. The PCU 11 is a control unit which can control the input/output of the electric power between the battery 12 and each motor generator, or the input/output of the electric power between the motor generators (i.e. in this case, the electric power is given and received between the motor generators without via the battery 12). The PCU 11 is electrically connected to the ECU 100, and the operations of the PCU 11 are controlled by the ECU 100.

The battery 12 is a battery unit which has such a structure that a plurality of unit battery cells are series-connected and which functions as an electric power source associated with the electric power for the power running of the motor generator MG 1 and the motor generator MG2. The battery 12 is one example of the "storage battery device" of the present invention.

The accelerator opening sensor 13 is a sensor which can detect an accelerator opening degree Ta which is the operation amount of a not-illustrated accelerator pedal of the hybrid vehicle 1. The accelerator opening sensor 13 is electrically connected to the ECU 100, and the detected accelerator opening degree Ta is referred to by the ECU 100 with a constant or irregular period.

The vehicle speed sensor 14 is a sensor which can detect a vehicle speed V of the hybrid vehicle 1. The vehicle speed sensor 14 is electrically connected to the ECU 100, and the detected vehicle speed V is referred to by the ECU 100 with a constant or irregular period.

Figure 2:
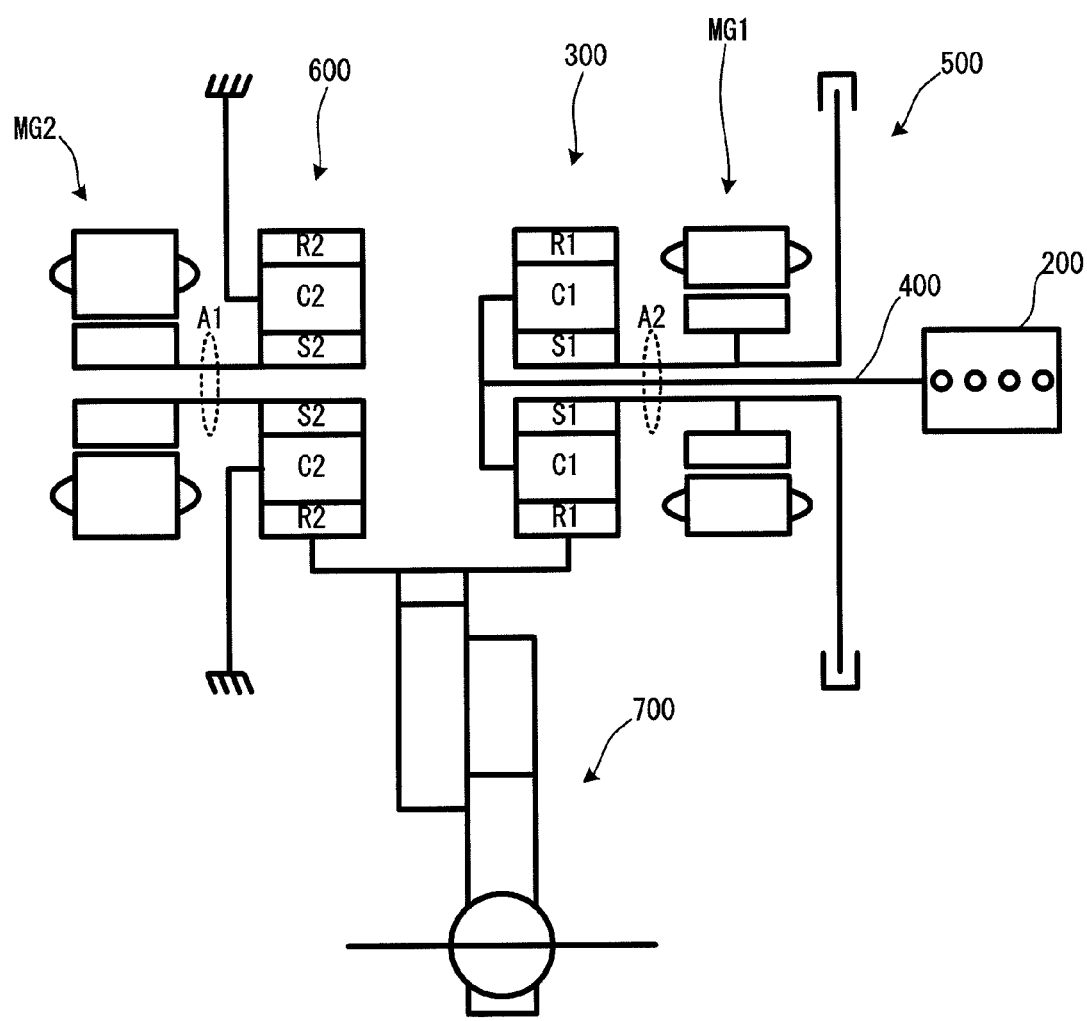
FIG. 2 is a schematic configuration diagram conceptually showing the structure of a hybrid drive apparatus in the hybrid vehicle in FIG. 1.

Now, with reference to FIG. 2, the detailed structure of the hybrid drive apparatus 10 will be explained. FIG. 2 is a schematic configuration diagram conceptually showing the structure of the hybrid drive apparatus 10. Incidentally, in FIG. 2, the overlap points with FIG. 1 will carry the same reference numerals, and the explanation thereof will be omitted as occasion demands.

In FIG. 2, the hybrid drive apparatus 10 is provided with an engine 200, a power dividing mechanism 300, a motor generator MG1 (hereinafter abbreviated to as a "MG1" as occasion demands), a motor generator MG2 (hereinafter abbreviated to as a "MG2" as occasion demands), an input shaft 400, a locking mechanism 500, a MG2 reduction mechanism 600, and a reduction gear mechanism 700.

The engine 200 is an in-line four-cylinder gasoline engine as one example of the "internal combustion engine" of the present invention, which functions as the main power source of the hybrid vehicle 1. The engine 200 is a known gasoline engine, and the detailed structure thereof will be omitted here. An engine torque Te as the output power of the engine 200 is output to the input shaft 400 of the hybrid drive apparatus 10 via a not-illustrated crank shaft. Incidentally, the engine 200 is merely one example of the practical aspect which can be adopted by the internal combustion engine of the present invention. As the practical aspect of the internal combustion engine of the present invention, not only the engine 200 but also known various engines can be adopted.

The motor generator MG1 is a motor generator, provided with a power running function for converting electrical energy to kinetic energy and a regeneration function for converting kinetic energy to electrical energy.

The motor generator MG2 is a motor generator as one example of the "rotating electrical machine" of the present invention having a bigger body size than the motor generator MG1. As in the motor generator MG1, the motor generator MG2 is provided with the power running function for converting electrical energy to kinetic energy and the regeneration function for converting kinetic energy to electrical energy.

Incidentally, the motor generators MG1 and MG2 may be constructed as synchronous motor generators, and each of them may have the structure that it is provided with a rotor having a plurality of permanent magnets on an outer circumferential surface and a stator in which a three-phase coil for forming a rotating magnetic field is wound. Of course, it may have a different structure.

The power dividing mechanism 300 is a planetary gear mechanism as one example of the "power transmission mechanism" of the present invention.

The power dividing mechanism 300 is provided with: a sun gear S1 as one example of the "rotational element" of the present invention, disposed in the central part; a ring gear R1 as another example of the "rotational element" of the present invention, concentrically disposed on the outer circumference of the sun gear S1; a plurality of pinion gears (not illustrated), disposed between the sun gear S1 and the ring gear R1 and revolving around the sun gear S1 on the outer circumference of the sun gear S1 while rotating on its axis; and a carrier C1 as another example of the "rotational element" of the present invention, for pivotably supporting the rotating shaft of each pinion gear.

Here, the sun gear S1 is coupled with the rotor of the motor generator MG1 so as to share its rotating shaft, and its rotational speed is equivalent to the rotational speed of the MG1, i.e. a MG1 rotational speed Nmg1. Moreover, the ring gear R1 is coupled with the reduction gear mechanism 700 and a ring gear R2 described later of the MG2 reduction mechanism 600, and its rotational speed is equivalent to the rotational speed of the drive shaft, i.e. an output rotational speed Nout. Moreover, the carrier C1 is coupled with the input shaft 400 which is coupled with the crank shaft of the engine 200, and its rotational speed is equivalent to the engine rotational speed NE of the engine 200.

The MG2 reduction mechanism 600 is the same planetary gear mechanism as the power dividing mechanism 300. The MG2 reduction mechanism 600 is provided with: a sun gear S2 disposed in the central part; a ring gear R2 concentrically disposed on the outer circumference of the sun gear S2; a plurality of pinion gears (not illustrated), disposed between the sun gear S2 and the ring gear R2 and revolving around the sun gear S2 on the outer circumference of the sun gear S2 while rotating on its axis; and a carrier C2 for pivotably supporting the rotating shaft of each pinion gear. The rotor of the motor generator MG2 is coupled with the sun gear S2.

Here, the ring gear R2 of the MG2 reduction mechanism 600 is coupled with the ring gear R1 of the power dividing mechanism 300 as described above, and it shows a rotational state unique to the axle. Moreover, the carrier C2 is fixed to a fixed element such that it cannot rotate. Therefore, to the motor generator MG2 fixed to the remaining one rotational element, i.e. the sun gear S2, the rotation of the drive shaft is transmitted in the form that it is reduced in accordance with a speed reduction ratio determined according to a gear ratio between the gears which constitute the MG2 reduction mechanism 600. Moreover, the MG2 reduction mechanism 600 is merely a reduction gear mechanism, and a compound planetary gear mechanism defined by the MG2 reduction mechanism 600 and the power dividing mechanism 300 constitutes a 2-rotational degree-of-freedom differential mechanism, and the rotational speed of the motor generator MG2, i.e. a MG2 rotational speed Nmg2, is unique in accordance with the vehicle speed V.

The reduction mechanism 700 is a gear mechanism including the drive shaft (whose reference numeral is omitted) which shows the rotational state unique to the axle, a reduction gear (whose reference numeral is omitted) coupled with the drive shaft, and a differential (whose reference numeral is omitted). By the reduction mechanism 700, the rotational speed of each axle is transmitted to the drive shaft in the state that it is reduced in accordance with a predetermined gear ratio. The ring gear R1 and the ring gear R2 are coupled with the drive shaft as described above, and each ring gear shows a rotational state unique to the vehicle speed V.

Incidentally, the motor generator MG2 can act its output torque, i.e. a MG2 torque Tm, on the drive shaft, as opposed to the motor generator MG1 and the engine 200. Therefore, the motor generator MG2 can also assist the run of the hybrid vehicle 1 by adding the torque to the drive shaft and can regenerate the electric power by inputting the torque from the drive shaft. The input/output torque of the motor generator MG2, i.e. the MG2 torque Tm, is dominantly controlled by the ECU 100 via the PCU 11, together with the input/output torque of the motor generator MG1, i.e. a MG1 torque Tg.

Incidentally, in the hybrid drive apparatus 10, rotation sensors such as a resolver are attached to regions corresponding to illustrated dashed line frames A1 and A2, to thereby detect the rotational speeds of detection regions. The rotation sensors are electrically connected to the ECU 100, and each of the detected rotational speeds is sent to the ECU 100 with a constant or irregular period. Further to that, the rotational speed of the region corresponding to the illustrated dashed line frame A1 is the MG2 rotational speed Nmg2, and the rotational speed of the region corresponding to the illustrated dashed line frame A2 is the MG1 rotational speed Nmg1.

The power dividing mechanism 300 can divide the engine torque Te supplied from the engine 200 to the input shaft 400, into the sun gear S1 and the ring gear R1 by using the carrier C1 at a predetermined ratio (ratio according to the gear ratio between the gears) under the aforementioned configuration, and it can divide the power of the engine 200 into two systems. At this time, in order to make it easy to understand the operations of the power dividing mechanism 300, if a gear ratio ρ is defined as the number of teeth of the sun gear S1 with respect to the number of teeth of the ring gear R1, a torque Tes acting on the sun gear S1 when the engine torque Te is acted on the carrier C1 from the engine 200 is expressed by the following equation (1), and an engine direct torque Ter which appears in the drive shaft is expressed by the following equation (2).

$$Tes = -Te \times \rho/(1+\rho) \quad (1)$$

$$Ter = Te \times 1/(1+\rho) \quad (2)$$

Incidentally, the structure in the embodiment of the "power transmission mechanism" of the present invention is not limited to that of the power dividing mechanism 300. For example, the power transmission mechanism of the present invention may be a compound planetary gear mechanism in which a plurality of planetary gear mechanisms are combined.

The locking mechanism 500 is a known wet multi-plate clutch mechanism, as one example of the "locking device" of the present invention. The locking mechanism 500 is provided with a first clutch plate coupled with the rotating shaft of the motor generator MG1 and a second clutch plate coupled with the fixed element. The engagement state of the clutch plates is controlled by a not-illustrated hydraulic control mechanism. At this time, in the state that the clutch plates engage with each other, the motor generator MG1 is locked to be non-rotatable, so that a so-called MG1 lock state is realized. On the other hand, in the state that the clutch plates are released, the motor generator MG1 is freely rotatable. Incidentally, the motor generator MG1 is coupled with the sun gear S1 of the power dividing mechanism 300, and the locking of the motor generator MG1 is equivalent to the locking of the sun gear S1. In other words, if the clutch plates of the locking mechanism 500 engage with each other, the sun gear S1 becomes in the lock state of the present invention, and if the clutch plates are released, the sun gear becomes in the non-lock state of the present invention.

Incidentally, the locking mechanism 500 is merely one example of the practical aspect which can be adopted by the locking device of the present invention. The locking device of the present invention may be another engagement apparatus, such as an electromagnetic dog clutch mechanism and an electromagnetic cam-lock mechanism.

<Operations in Embodiment>
<Details of Speed Change Mode>

The hybrid vehicle 1 in the embodiment can select a fixed speed change mode and a stepless speed change mode, as one example of the speed change mode of the present invention, in accordance with the state of the sun gear S1 of the power dividing mechanism 300 which is a locking target.

Figure 3:
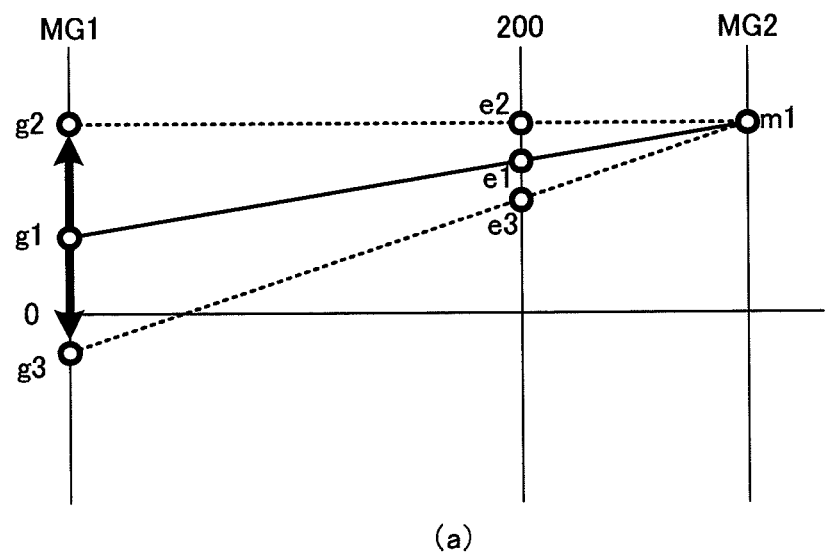
FIG. 3 are operational collinear diagrams exemplifying one operating state of the hybrid drive apparatus in FIG. 2.
Figure 3:
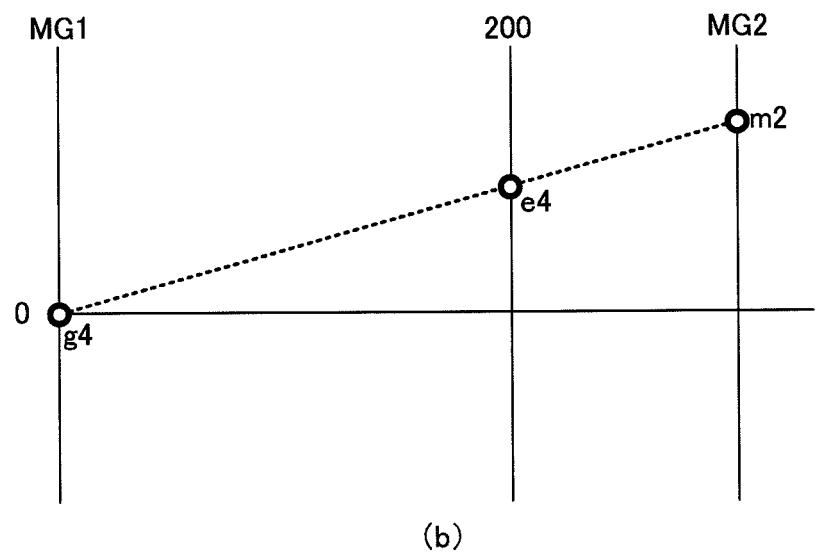

Now, with reference to FIG. 3, the speed change mode of the hybrid vehicle 1 will be explained. FIG. 3 are operational collinear diagrams exemplifying one operating state of the hybrid drive apparatus 10. Incidentally, in FIG. 3, the overlap points with FIG. 2 will carry the same reference numerals, and the explanation thereof will be omitted as occasion demands.

In FIG. 3(a), the vertical axis represents the rotational speed, and the horizontal axis shows the motor generator MG1 (unique to the sun gear S1), the engine 200 (unique to the carrier C1) and the motor generator MG2 (unique to the drive shaft) from the left in order.

Here, the power dividing mechanism 300 is a 2-degree-of-freedom rotational planetary gear mechanism, made of a plurality of rotational elements which mutually have a differential relation. If the rotational speeds of two elements of the sun gear S1, the carrier C1 and the ring gear R1, the rotational speed of the remaining one rotational element is inevitably determined. In other words, in the operational collinear diagram, the operational state of each rotational element can be shown by one operational collinear corresponding to one operational state of the hybrid drive apparatus 10 in a one-on-one manner.

In FIG. 3(a), it is assumed that the operating point of the motor generator MG2, which has a unique relation to the vehicle speed V and the output rotational speed Nout, is an operating point m1. In this case, if the operating point of the motor generator MG1 is an operating point g1, the operating point of the engine 200 coupled with the carrier C1, which is one of the remaining rotational elements, is an operating point e1. At this time, if the operating point of the motor generator MG1 is changed to an operating point g2 and an operating point g3 while the output rotational speed Nout as the rotational speed of the drive shaft is maintained, then, the operating point of the engine 200 changes to an operating point e2 and an operating point e3, respectively.

In other words, in this case, by making the motor generator MG1 function as a rotational speed control mechanism, the engine 200 can be operated at a desired operating point. The speed change mode corresponding to this state is the stepless speed change mode. In the stepless speed change mode, the operating point of the engine 200 (the operating point in which case means one operational condition of the engine 200 defined by a combination of the engine rotational speed NE and the engine torque Te) is controlled to an optimum fuel consumption operating point at which the fuel consumption rate of the engine 200 is basically minimal.

Here, in the stepless speed change mode, the MG1 rotational speed Nmg1 obviously needs to be variable. Thus, if the stepless speed change mode is selected, the drive state of the locking mechanism 500 is controlled such that the sun gear S1 is in the non-lock state.

In the power diving mechanism 300, in order to supply the torque Ter corresponding to the engine torque Te descried above to the drive shaft, it is necessary to supply a reaction torque having the same magnitude as that of the aforementioned torque Tes and having a reversed sign (i.e. a negative torque) from that of the aforementioned torque Tes, which appears on the rotating shaft of the sun gear S1 (here, referred to as a "sun gear shaft" for descriptive purpose), from the motor generator MG1 to the sun gear shaft. In this case, in an operating point in a positive rotation area such as the operating point g1 or the operating point g2, the MG1 is in an electric power regeneration state (i.e. an electric generation state) of positive rotation and negative torque. As described above, in the stepless speed change mode, by making the motor generator MG1 function as a reaction element, the electric power regeneration (or electric generation) is performed in one portion of the engine torque Te distributed to the sun gear shaft while one portion of the engine torque Te is supplied to the drive shaft. If the direct torque from the engine 200 does not suffice for the torque required for the drive shaft (i.e. the required torque of the hybrid vehicle 1, the MG2 torque Tm as an assist torque is supplied, as occasion demands, from the motor generator MG2 to the drive shaft by using the regenerated electric power or by appropriately providing an electric power from the battery 12.

On the other hand, for example, at the time of a high-speed, light-load run or the like, the MG1 is at an operating point in a negative rotation area such as the operating point g3 in such an operating condition that the engine rotational speed Ne is low although the output rotational speed Nout is high. The motor generator MG1 outputs the negative torque as the reaction torque of the engine torque Te. Thus, in this case, the MG1 is in a state of negative rotation and negative torque, and in a power running state. In other words, in this case, the input/output torque Tg of the motor generator MG1 is transmitted to the drive shaft as the drive torque of the hybrid vehicle 1.

On the other hand, in the hybrid drive apparatus 10, the engine 200, the MG1 and the MG2 are cooperatively controlled with each other such that a sum of the engine direct torque Ter and the MG2 torque Tm matches a driver request torque, and if the MG1 is in the power running state, the motor generator MG2 is in the negative torque state as it absorbs an excessive torque to the required torque, which is supplied to the drive shaft. In this case, the motor generator MG2 is in the state of positive rotation negative torque and in the electric power generation state. In this state, there arises an inefficient electrical path referred to so-called power circulation in which the driving force from the MG1 is used for the electric power generation on the MG2 and in which the power running drive of the MG1 is performed by the electric power generation. In the state that the power circulation occurs, the system efficiency of the hybrid drive apparatus 10 decreases.

Thus, in the hybrid vehicle 1, the sun gear S1 is controlled to be in the lock state by the locking mechanism 500 in an operating area determined in advance to be an area in which the power circulation can occur. The situation is shown in FIG. 3(b). If the sun gear S1 moves into the lock state by the locking mechanism 500, the operating point of the motor generator MG1 is fixed to an illustrated operating point g4 corresponding to a rotational speed of zero.

In this case, the output rotational speed Nout and the zero rotation cause the remaining engine rotational speed Ne to be uniquely fixed, and its operating point is e4 shown in FIG. 3(b). In other words, if the sun gear S1 is locked, the engine rotational speed Ne is uniquely determined by the MG2 rotational Nmg2 unique to the vehicle speed V (i.e. a transmission gear ratio becomes constant). The speed change mode corresponding to this state is the fixed speed change mode.

In the fixed speed change mode, the reaction torque of the engine torque Te which is originally to be received by the motor generator MG1 can be replaced by the physical engagement force of the locking mechanism 500. In other words, in this case, it is not necessary to control the motor generator MG1 in the electric power regeneration state and in the power running state, and the motor generator MG1 can be stopped. Therefore, basically, it is not necessary to operate the motor generator MG2 either, and the MG2 becomes in a so-called idling state. In the end, in the fixed speed change mode, the drive torque which appears on the drive shaft is only the direct torque Ter divided to the drive shaft side by the power dividing mechanism 300, out of the engine torque Te, and the hybrid drive apparatus 10 performs only mechanical power transmission, so that its transmission efficiency improves.

Incidentally, in the fixed speed change mode, the motor generator MG2 does not necessarily need to be stopped. For example, the hybrid vehicle 1 is provided with various electric accessories, and a proper drive electric power is necessary for the drive of the electric accessories. The motor generator MG2 may perform small-scale electric power regeneration in order to supply an electric power corresponding to the drive electric power to the battery 12. In this case, the ECU 100 controls the engine torque Te such that the direct component of the engine torque Te is excess to the torque required to run the vehicle, and the excessive torque is regenerated on the motor generator MG2. Alternatively, if only the engine direct torque Ter does not suffice for the torque of the drive shaft, then, of course, the power running drive of the motor generator MG2 is performed, and the drive torque is assisted by the MG2 torque Tm, as occasion demands.

Moreover, apart from that, the ECU 100 performs SOC feedback control for continually maintaining the SOC of the battery 12 at a target value SOCtag. With the stepless speed change mode or the fixed speed change mode, the ECU 100 controls the amount of electric power regeneration in the motor generator MG1 and the motor generator MG2 such that the SOC of the battery 12 is maintained at a target value of about 70 to 80% (a preset value determined in advance). For example, the operational states of the engine 200, the MG1 and the MG2 are controlled such that the amount of electric power regeneration is relatively large if the SOC is lower than the target value and such that the amount of providing the electric power from the battery 12 increases if the SOC is higher than the target value.

<Details of Rattle Suppression Control>

Here, the power dividing mechanism 300 is a mechanical gear mechanism, so that each gear which is the rotational element has a play such as a backlash in its rotational direction. Although it can promote the smooth operation of the rotational element, the play causes a noise referred to a so-called rattle.

More specifically, the power dividing mechanism 300 is coupled with the engine 200 as an excitation source via the input shaft 400, and physical vibration with the engine 200 as the excitation source is transmitted to each of the rotational elements of the power dividing mechanism 300 via the input shaft 400. Here, if a torque which can suppress the physical vibration is acted on each rotational element, the physical vibration will not cause the rattle. Therefore, the sun gear S1 corresponding to the motor generator MG1 which provides the reaction torque basically for the engine 200 hardly becomes the source of this type of rattle.

However, the motor generator MG2 which is coupled with the drive shaft and which relatively keeps control independency can adopt a non-operational state or a relatively small-scale electric power regeneration state for driving the accessories, for example, as in an extreme case, in the operating condition that only the direct torque Te as the direct component of the engine torque Te can suffice for the driver request torque. For example, if the MG torque Tm is near a zero torque, the physical vibration with the engine 200 as the excitation source likely vibrates, for example, the ring gear R1 in the range of its play and likely causes the rattle. Such a rattle is a factor to reduce the drivability of the hybrid vehicle 1. Thus, the hybrid vehicle 1 is constructed such that the rattle suppression control performed by the ECU 100 suppresses the reduction in drivability due to the rattle.

Now, with reference to FIG. 4, the details of the rattle suppression control will be explained. Here, FIG. 4 is a flowchart showing the rattle suppression control.

Figure 4:
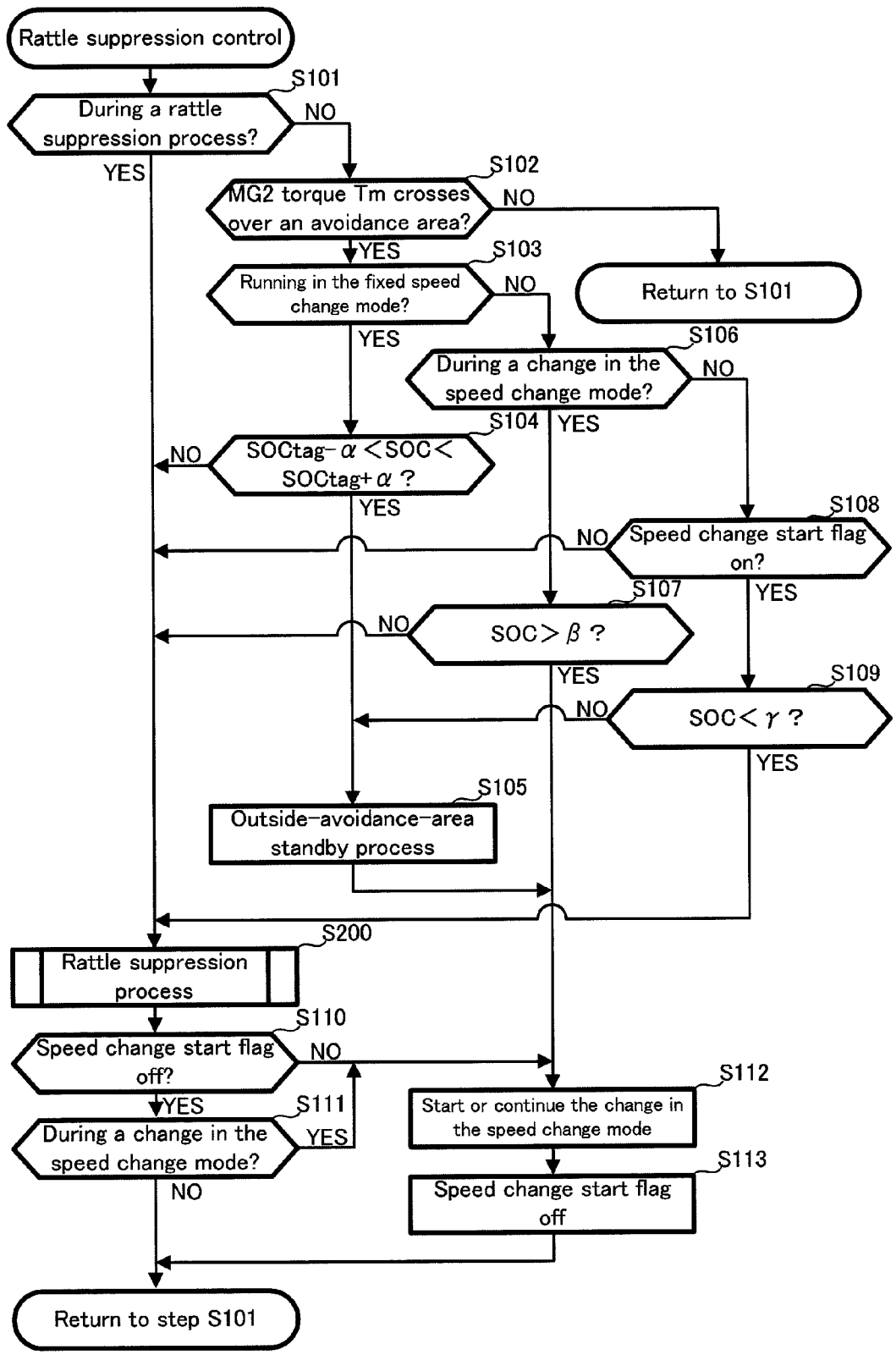
FIG. 4 is a flowchart showing rattle suppression control performed by an ECU in the hybrid vehicle in FIG. 1.

In FIG. 4, the ECU 100 judges whether or not it is during a rattle suppression process described later (step S101).

If it is during the rattle suppression process (the step S101: YES), the ECU 100 continues the rattle suppression process (step S200).

If the rattle suppression process is performed, the ECU 100 judges whether or not a speed change start flag is off (step S110). Here, the speed change start flag is a flag which is on if a change in the speed change mode by the locking mechanism 500 is requested (in timing before the change in the speed change mode is actually started), and whose state is controlled by the ECU 100.

If the speed change start flag is off (the step S110: YES), the ECU 100 judges whether or not it is during a change in the speed change mode (step S111). If it is not during the change in the speed change mode (the step S111: NO), the ECU 100 returns the process to the step S101.

If the speed change start flag is on (the step S110: NO) or if it is during the change in the speed change mode (step S111: YES), the ECU 100 starts or continues the change in the speed change mode (step S112), sets the speed change start flag to be off (step S113), and returns the process to the step S101.

In the step S101, if it is not during the rattle suppression process (the step S101: NO), the ECU 100 judges whether or not the MG2 torque Tm crosses an avoidance area (step S102).

Here, the avoidance area is one example of the "avoidance area" of the present invention and a rattle occurrence area near the zero torque, which crosses or covers positive and negative torque areas centered on the zero torque. The avoidance area is experimentally determined in advance, as an area for causing the deterioration of drivability which is not allowed easily in practice because of the rattle. The rattle can occur, of course, not only in a case where the MG2 torque Tm is in the avoidance area but also in a case where the MG2 torque Tm adopts a state referred to as so-called zero torque crossover in which the MG2 torque Tm transmits from one torque area to another torque area outside the avoidance area. On the other hand, this zero torque crossover is a phenomenon which can occur at a not low frequency in terms of the structure of the hybrid drive apparatus 10.

If the MG2 torque Tm does not cross the avoidance area (the step S102: NO), there is no need to take measures against the rattle, so the process is returned to the step S101.

If the MG2 torque Tm crosses the avoidance area (the step S102: YES), the ECU 100 judges whether or not the speed change mode at that time point is the fixed speed change mode (step S103). If the hybrid vehicle 1 is running in the fixed speed change mode (the step S103: YES), the ECU 100 obtains the SOC (one example of the "quantity of state corresponding to the storage state" of the present invention and quantified as a fully discharge state of 0(%) and a fully charge state of 100(%)) which represents the state of change of the battery 12, from a SOC sensor (whose illustration is omitted) attached to the battery 12 and judges whether or not the obtained SOC is in a reference range defined as a range between a lower limit value SOCtag−α and an upper limit value SOCtag+α (step S104). Here, the SOCtag is the reference value of the SOC, for example, a value of about 70 to 80(%); however, the reference value SOCtag may be determined in an arbitrary manner.

Moreover, α for defining the referenced range is a value collating with a target MG2 torque Tmtag as the target value of the MG2 torque Tm, and it is a threshold value for defining whether or not the target MG2 torque Tmtag as the target value of the MG2 torque Tm for maintaining the SOC of the battery 12 at the reference value SOCtag is set in the torque area outside the avoidance area. If the obtained SOC is not in the reference range (the step S104: NO), the ECU 100 moves the process to the step S200 and starts or continues the rattle suppression process.

On the other hand, if the obtained SOC is in the reference range (the step S104: YES), the ECU 100 performs an outside-avoidance-area standby process (step S105). The outside-avoidance-area standby process is a process of temporarily stopping a convergence to the target MG2 torque Tmtag and of maintaining the MG2 torque Tm in the torque area outside the avoidance area. Incidentally, the method of temporarily stopping the convergence to the target MG2 torque Tmtag can include not only stopping the feedback control for making the MG2 torque Tm converge to the target MG2 torque Tmtag but also a provisional step or the like for setting the obtained SOC to the reference value SOCtag. In other words, in the latter case, an apparent deviation in the SOC feedback control is zero, so that the target MG2 torque Tmtag is maintained at a current value. The effect of the outside-avoidance-area standby process will be described later.

Incidentally, in the outside-avoidance-area standby process, the MG2 torque Tm is controlled basically not to depart from the torque area at the time point. In other words, it is forbidden that the MG2 torque crosses the avoidance area from the current torque area (positive or negative torque area) and is maintained in the torque in the negative or positive torque area. If the outside-avoidance-area standby process is performed, then, the process is moved to the step S112, the current speed change mode (i.e. in this case, the fixed speed change mode) is continued, and the process is returned to the step S101 via the step S113.

In the step S103, if the current speed change mode is the stepless speed change mode (the step S103: NO), the ECU 100 judges whether or not it is during a change in the speed change mode (step S106).

If it is during the change in the speed change mode (the step S106: YES), the ECU 100 judges whether or not the obtained SOC of the battery 12 is greater than a threshold value β (step S107). Incidentally, the threshold value β is a compatible value experimentally determined such that the reduction in SOC remains within an acceptable range even if the avoidance area crossover of the MG2 torque Tm is forbidden in the speed change mode change period. If the SOC of the battery 12 is less than or equal to the threshold value β (the step S107: NO), the ECU 100 starts or continues the rattle suppression process (the step S200). If the SOC of the battery 12 is greater than the threshold value β (the step S107: YES), the ECU 100 continues the change in the speed change mode (the step S112). At this time, the MG2 torque Tm is maintained at the value at the time point.

On the other hand, in the step S106, if the hybrid vehicle 1 is running in the stepless speed change mode and it is not during the change in the speed change mode (the step S106: NO), the ECU 100 judges whether or not the speed change start flag is on (step S108). If the speed change start flag is off (the step S108: NO), the process is moved to the step S200, and the rattle suppression process is started or continued.

If the speed change start flag is on (the step S108: YES), i.e. if there is a speed change request to change to the fixed speed change mode during the running in the stepless speed change mode, the ECU 100 judges whether or not the obtained SOC of the battery 12 is less than a threshold value γ (γ>β) (step S109). The threshold value γ in the step S109 is a reference value used for a comparison with the quantity of state (i.e. SOC) corresponding to the storage state of the battery 12 as the storage battery device, and it is a value for defining the priority between the change in the speed change mode and the avoidance area crossover of the MG2 torque Tm. Incidentally, the threshold value γ is the SOC that can forbid the avoidance area crossover of the MG2 torque Tm in the whole speed change mode change period, and the aforementioned threshold value β is the SOC that can forbid the avoidance area crossover in a part of the speed change mode change period. Therefore, the threshold value γ is greater than the threshold value β.

The ECU 100 performs the outside-avoidance-area standby process (the step S105) if the obtained SOC is greater than or equal to the threshold value γ (the step S109: NO) and performs the rattle suppression process (the step S200) if the obtained SOC is less than the threshold value γ (the step S109: YES).

Here, in the former case, the change in the speed change mode performed before the avoidance area crossover of the MG2 torque Tm in the step S112, then, the step S101 becomes "NO", the step S102 becomes "YES", the step S103 becomes "YES", and the step S104 becomes "NO", and then the rattle suppression process is performed in the step S200. In other words, the MG2 torque Tm starts the convergence to the original target value after the change in the speed change mode. On the other hand, in the latter case, the avoidance area crossover of the MG2 torque Tm is performed before the change in the speed change mode in the step S200, then, the step S110 becomes "NO", so that the change in the speed change mode is started in the step S112. The rattle suppression control is performed as described above.

Incidentally, the rattle suppression control in FIG. 4 provides a flow in which the avoidance area crossover from the positive torque area is assumed as the avoidance area crossover of the MG2 torque Tm and in which the change in the speed change mode from the stepless speed change mode to the fixed speed change mode is assumed as the change in the speed change mode. It is obvious, however, that the rattle suppression control can be performed even on another change in the speed change mode or another direction of the avoidance area crossover on the basis of the same concept.

For example, if the avoidance area crossover from the negative torque area to the positive torque area is assumed, the process corresponding to the judgment result and the value of the threshold value γ in the step S109 may be different. More specifically, in the negative torque area, i.e. a regeneration area, if the SOC of the battery 12 is high (if the step S109 branches to the NO side), the avoidance area crossover by the rattle suppression process may be performed before the change in the speed change mode, as there is a possibility that the SOC of the battery 12 exceeds an acceptable value in the speed change mode change period. If the SOC of the battery 12 is low (if the step S109 branches to the YES side), the change in the speed change mode may be performed before the avoidance area crossover by the rattle suppression process, as there is no problem in that the SOC of the battery 12 increases in the speed change mode change period.

Figure 5:
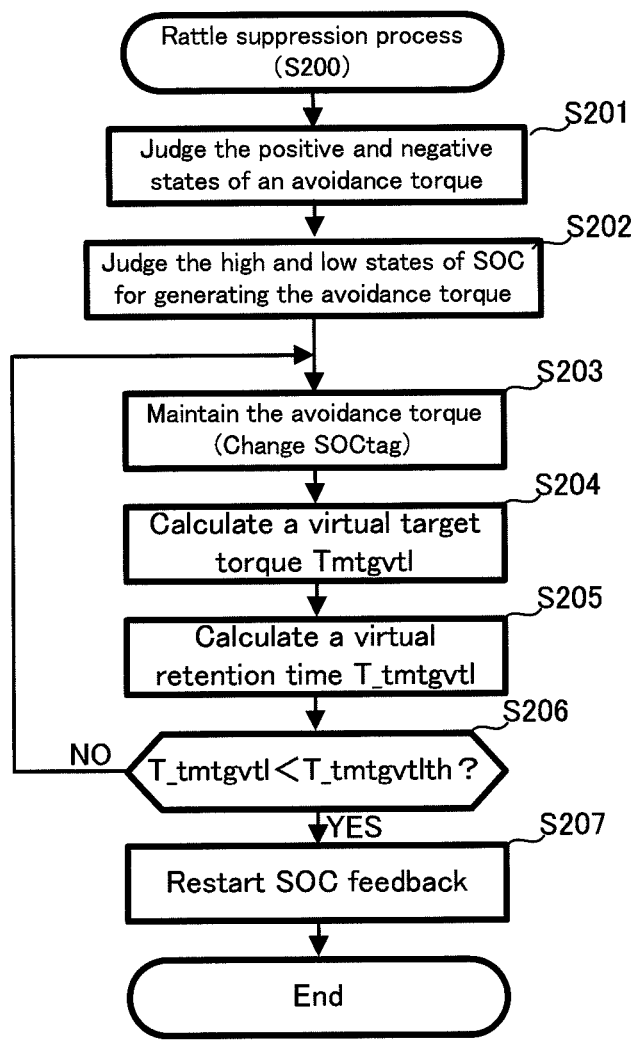
FIG. 5 is a flowchart showing a rattle suppression process performed in the rattle suppression control in FIG. 4.

Next, with reference to FIG. 5, the details of the rattle suppression process will be explained. FIG. 5 is a flowchart showing the rattle suppression process.

In FIG. 5, the ECU 100 judges the positive and negative states of an avoidance torque (step S201). Incidentally, the avoidance torque is a torque which is to be outputted in a period in which the avoidance area crossover of the MG2 torque is avoided, and normally, the value of the MG2 torque Tm at the time point is adopted. If the positive and negative states of the avoidance torque are judged, then, the high and low states of the SOC for generating the avoidance torque are judged (step S202). In other words, it is judged on which side of the original reference value SOCtag there is the provisional target value of the SOC feedback control. Incidentally, the provisional target value is, namely, the SOC of the battery at the time point.

After the judgments, the ECU 100 changes the target value of the SOC feedback control from the original target value SOCtag to the provisional target value, temporarily maintains the deviation in the SOC feedback control at zero, and substantially stops the SOC feedback control (step S203).

Then, the ECU 100 calculates a virtual target torque Tmtgvtl, which is the virtual target value of the MG2 torque Tm (step S204). Here, the virtual target torque Tmtgvtl is the original target value of the MG2 torque Tm, set in accordance with the deviation (i.e. reference deviation) between the original target value, SOCtag, and the SOC of the battery 12 if the SOC feedback control is restarted. If the virtual target torque Tmtgvtl is calculated, the ECU 100 further calculates a virtual retention time T_tmtgvtl (step S205).

Here, the virtual retention time T_tmtgvtl is a time required for the passage of the MG2 torque Tm through the avoidance area when the MG2 torque Tm converges to the virtual target torque Tmtgvtl obtained in the step S204, i.e. one example of the "crossover time" of the present invention. The virtual retention time T_tmtgvtl is substantially infinity if the virtual target torque Tmtgvtl is in the avoidance area. If the virtual target torque Tmtgvtl is in the torque area outside the avoidance area, the virtual retention time T_tmtgvtl becomes shorter as it deviates from a value for defining the boundary of the avoidance area i.e. as the deviation between the avoidance torque and the virtual target torque Tmtgvtl increases. Moreover, the virtual target torque Tmtgvtl changes in a direction that the deviation between the avoidance torque and the virtual target torque Tmtgvtl increases because the SOC deviates from the original reference value SOCtag (i.e. the reference deviation increases) as the MG2 torque is maintained in the avoidance torque for a longer time.

The ECU 100 judges whether or not the virtual retention time T_tmtgvtl is less than a predetermined threshold value T_tmtgvtlth (step S206). If the virtual retention time T_tmtgvtl is greater than or equal to the predetermined threshold value T_tmtgvtlth (the step S206: NO), the processes from the step S203 to the step S206 are repeated. Incidentally, the predetermined threshold value T_tmtgvtlth is a compatible value experimentally determined in advance such that the rattle generated in the crossover of the avoidance area does not deteriorate the drivability in practice.

If the virtual retention time T_tmtgvtl is less than the predetermined threshold value T_tmtgvtlth (the step S206:

YES), the ECU 100 restarts the SOC feedback control (step S207). The rattle suppression process is performed as described above.

Figure 6:
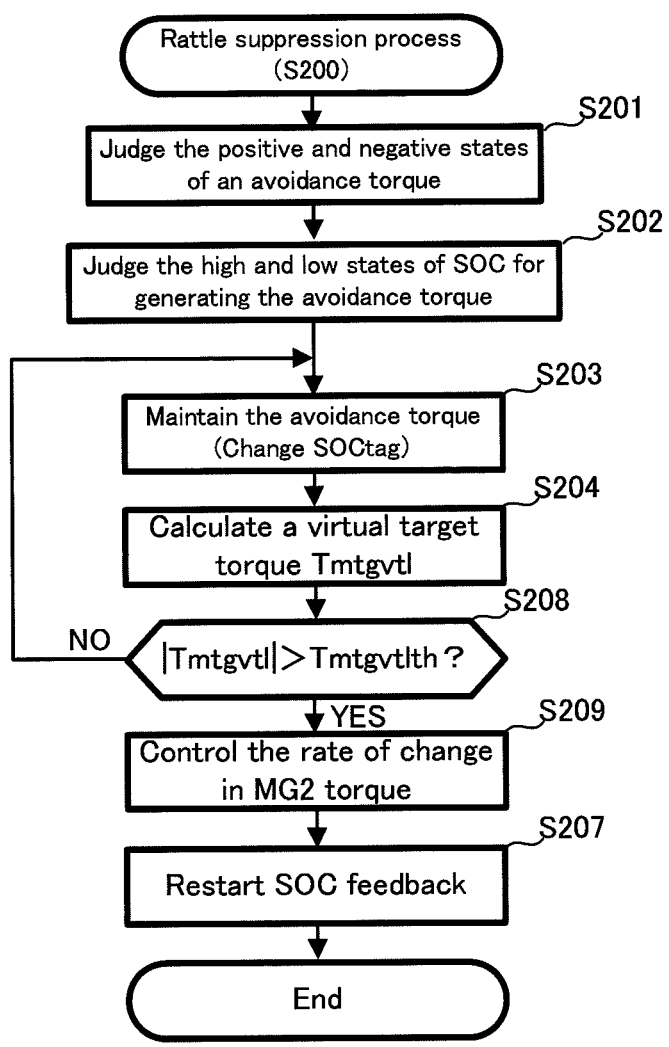
FIG. 6 is another flowchart showing another rattle suppression process performed in the rattle suppression control in FIG. 4.

Incidentally, the rattle suppression process can adopt an aspect other than the one shown in FIG. 5. Now, with reference to FIG. 6, another aspect of the rattle suppression process will be explained. FIG. 6 is another flowchart showing another rattle suppression process. Incidentally, in FIG. 6, the overlap points with FIG. 5 will carry the same reference numerals, and the explanation thereof will be omitted as occasion demands.

In FIG. 6, the ECU 100 judges whether or not the absolute value of the virtual target torque Tmtgvtl calculated in the step S204 is greater than a predetermined threshold value Tmtgvtlth (step S208). Here, the predetermined threshold value Tmtgvtlth is a value for defining the upper and lower limits of the avoidance area (if the avoidance area is set uniformly in the positive and negative torque areas)

If the absolute value of the virtual target torque Tmtgvtl is less than or equal to the predetermined threshold value Tmtgvtlth (the step S208: NO), i.e. if the virtual target torque Tmtgvtl is the torque in the avoidance area, then, the ECU 100 repeatedly performs the steps S203, S204 and S208. If the absolute value of the virtual target torque Tmtgvtl is greater than the predetermined threshold value Tmtgvtlth (the step S208: YES), i.e. if the virtual target torque Tmtgvtl is the torque outside the avoidance area, then, the ECU 100 sets the rate of change in the MG2 torque Tm on the higher speed side than the speed according to the normal control standard (step S209).

Incidentally, the ECU 100 performs the control that the sum of the engine direct torque Ter and the MG2 torque Tm is maintained in the driver request torque, so that the rate of change in the MG2 torque Tm is cooperatively controlled with the rate of change in the engine torque Te. On the other hand, the engine torque Te depends on the torque of the motor generator MG1 for applying the reaction torque. Thus, in the end, the control of the rate of change in the MG2 torque Tm is substantially equivalent to the control of the rate of change in the MG2 torque Tg.

Further to that, at the normal time in which the rattle suppression is not required, the rate of change on the higher speed side is not adopted (the time require for the crossover of the avoidance area in this case is a reference time). That is because the high-speed control of the torque has a large control load in that a high control accuracy is required and because the high-speed control of the torque tends to appear as an uncomfortable feeling for the driver. In other words, except a case where there is a purpose of rattle suppression (the uncomfortable feeling does not influence the drivability in comparison with the noise which is caused by the rattle), there is no practical benefit of adopting the high-speed control.

If the rate of change in the MG2 torque Tm is corrected to the high-speed side in the step S209 and the MG2 torque departs from the avoidance area, then, the process is moved to the step S207, thereby to restart the SOC feedback control. Even in this manner, the rattle can be preferably suppressed.

<Effect of Rattle Suppression Control>

Figure 7:
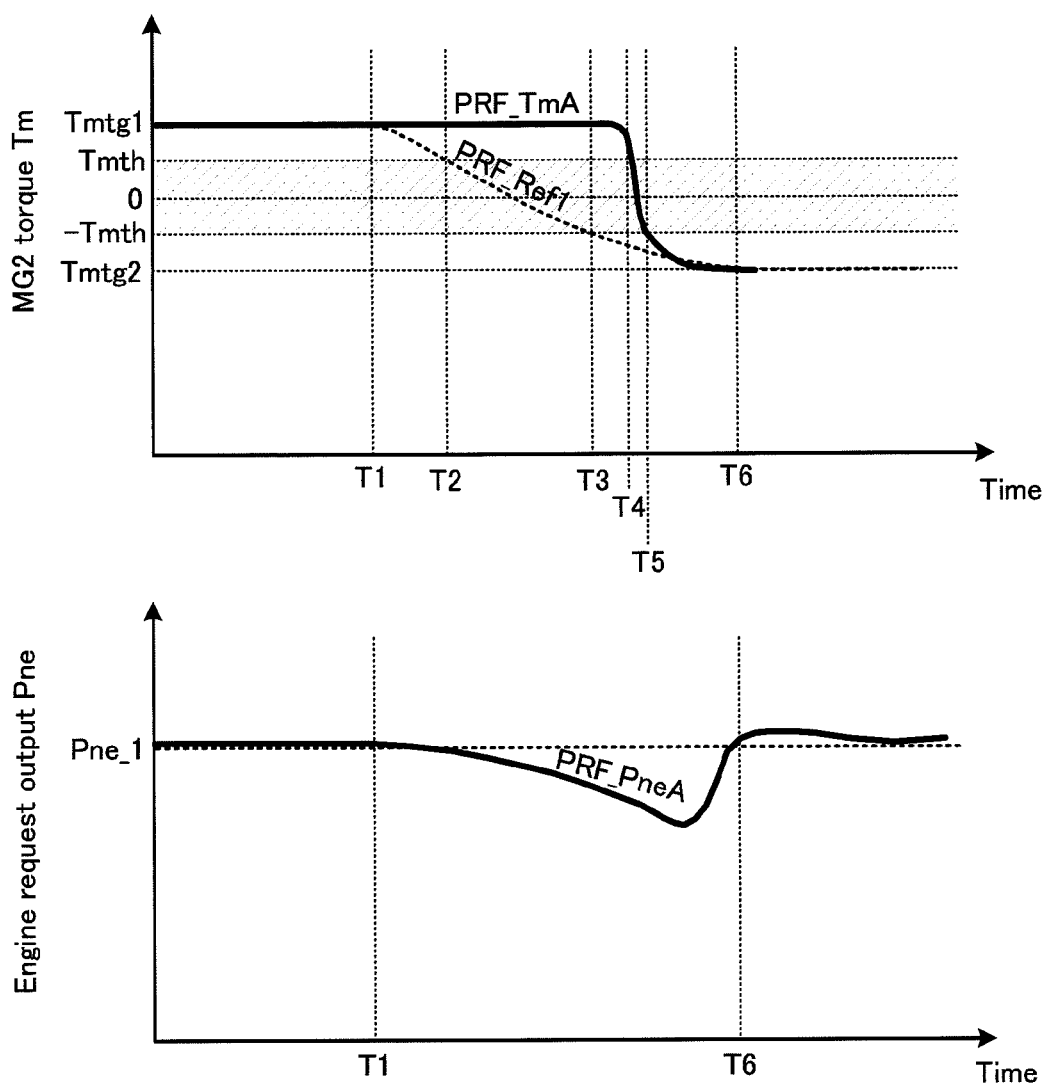
FIG. 7 is a schematic diagram exemplifying one time transition of a MG2 torque Tm and an engine request output Pne in a process of performing the rattle suppression control in FIG. 4.

Next, the effect of the rattle suppression control will be explained. Firstly, with reference to FIG. 7, the effect of the rattle suppression process will be explained. FIG. 7 is a schematic diagram exemplifying one time transition of the MG2 torque Tm and an engine request output Pne in a process of performing the rattle suppression control.

In FIG. 7, the upper part shows the time characteristic of the MG2 torque Tm, and the lower part shows the time characteristic of the engine request output Pne. Incidentally, FIG. 7 shows the time transition at the time of normal run according to the stepless speed change mode, which is not the speed change mode change period. Whether or not the avoidance area crossover of the MG2 torque occurs is determined depending on the magnitude of the MG2 torque Tm, so in the operating area that only the engine direct torque Ter can suffice most of the driver request torque, the required value of the MG2 torque Tm is not necessarily high. Moreover, the avoidance area crossover of the MG2 torque Tm can also occur depending on the operational states of the electric accessories of the hybrid vehicle 1 or the SOC of the battery 12.

In FIG. 7, PRF_Ref1 (refer to a dashed line) is a characteristic similar to a comparative example for clarifying the effect of the embodiment and a characteristic in a case where there is taken no measure to avoid the rattle. Moreover, PRF_TmA (refer to a solid line) is a characteristic in a case where there is taken a measure corresponding to the step S200 for the rattle suppression control in the embodiment.

Here, it is assumed that before a time point T1, the target MG2 torque Tmtg as the target value of the MG2 torque Tm is changed from Tmtg1 to Tmtg2. In this case, in the comparative example, the MG2 torque Tm starts to change to a reduction side at the time point T1, reaches the avoidance area (a hatched area defined by illustrated Tmth and −Tmth) at a time point T2, passes through the avoidance area at a time point T3, and finally converges on the target MG2 torque Tmtg2 at a time point T6.

On the other hand, if the rattle suppression process in the embodiment is performed, the MG2 torque Tm continues to maintain the current value even after the time point T1. At this time, the driver request torque is maintained, so that the engine request output Pne is temporarily set to a lower side than the original value (refer to illustrated PRF_PneA). As described above, if the MG2 torque Tm is maintained in the torque deviating from the original target torque (the torque on the regeneration area side), the SOC of the battery 12 starts to deviate from the reference value SOCtag which is the original target value, and the deviation increases.

If such a process is passed through and the SOC feed back control is restarted, for example, by satisfying the step S206 in FIG. 5 described above, at a time point T4, then, the MG2 torque Tm changes more rapidly than the comparison example and finally converges to Tmtg2 as the original target torque because the provisional target MG2 torque as the absolute value that is greater than Tmtg2 is set due to the enlarged deviation of the SOC.

Here, the crossover time required for the passage through the avoidance area is compared between the comparison example and the embodiment. The crossover time is a time corresponding to "T3-T2" in the comparison example, and it is a time corresponding to "T5-T4" in the embodiment. At this time, as is seen from FIG. 7, the latter is apparently smaller. In other words, if the measure associated with the embodiment is taken, the crossover time is dramatically reduced, and the occurrence of the rattle is effectively suppressed.

Figure 8:
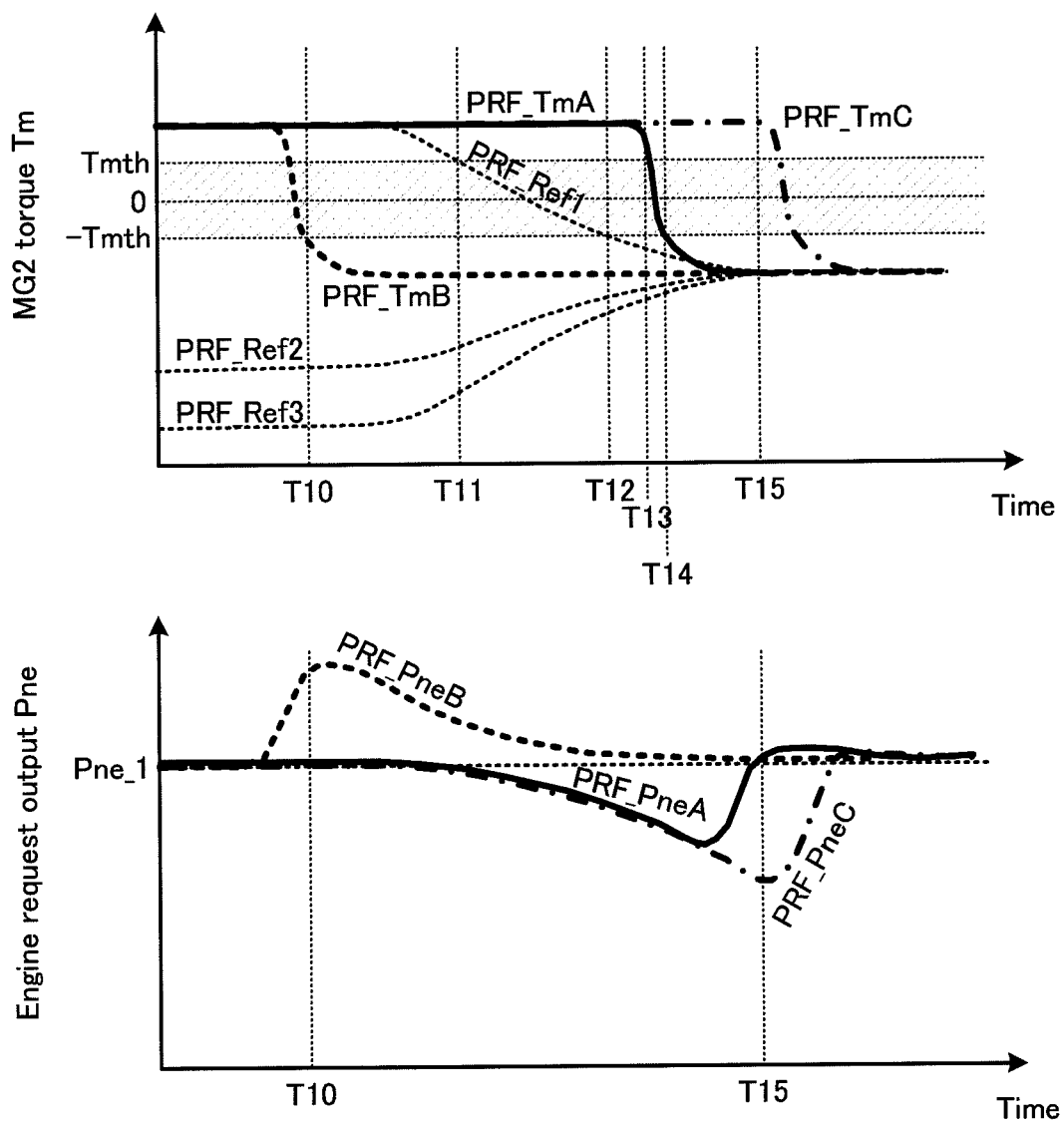
FIG. 8 is a schematic diagram exemplifying another time transition of the MG2 torque Tm and the engine request output Pne in the process of performing the rattle suppression control in FIG. 4.

Next, with reference to FIG. 8, the effect of the rattle suppression process will be further exampled. FIG. 8 is a schematic diagram exemplifying another time transition of the MG2 torque Tm and the engine request output Pne in the process of performing the rattle suppression control. Incidentally, in FIG. 8, the overlap points with FIG. 7 will carry the same reference numerals, and the explanation thereof will be omitted as occasion demands.

FIG. 8 exemplifies the time characteristics of the e MG2 torque Tm and the engine request output Pne mainly before and after the change in the speed change mode and during the change in the speed change mode, as in the step S107 or step S109 in FIG. 4.

Here, it is assumed that the change in the speed change mode is started at a time point T10 (i.e. the speed change start flag is set to be on before that and there is much time left to perform the judgment in the step S109). Here, the characteristic in the case where the rattle suppression process in the step S200 is performed during the change in the speed change mode (i.e. corresponding to the case where the step S107 is NO) is PRF_TmA (refer to a solid line). The characteristic in the case where the rattle suppression process is performed before the change in the speed change mode (i.e. corresponding to the case where the step S109 is NO) is PRF_TmB (refer to a dashed line). The characteristic in the case where the rattle suppression process is performed after the change in the speed change mode (i.e. corresponding to the case where the step S109 is YES) is PRF_TmC (refer to a chain line). Moreover, the corresponding time characteristics of the engine request output Pne are represented as PRF_PnA (solid line), PRF_PnB (dashed line) and PRF_PnC (chain line) in the lower part, respectively.

As shown in FIG. 8, even if the rattle suppression process is performed in any timing, the time required for the crossover of the avoidance area is reduced in comparison with the comparative example, and the reduction in drivability by the rattle is preferably suppressed. Here, particularly in the embodiment, basically, before the change in the speed change mode, it is judged which of the change in the speed change mode and the avoidance area crossover of the MG2 torque Tm is firstly performed. When there is the change in the speed change mode, the MG2 torque Tm changes like PRF_TmC or PRF_TmB.

In other words, according to the rattle suppression control in the embodiment, the speed change mode change period does not overlap the period that the MG2 torque crosses the avoidance area, and an increase in noise due to the overlap between them is avoided. Therefore, the reduction in drivability is preferably suppressed. However, it is also conceivable that sudden disturbances or the like cause a need for the avoidance area crossover during the change in the speed change mode. Even in such a case, however, the crossover time is reduced like PRF_TmA, which minimizes the reduction in drivability by the overlap between the change in the speed change mode and the avoidance area crossover of the MG2 torque Tm.

Figure 9:
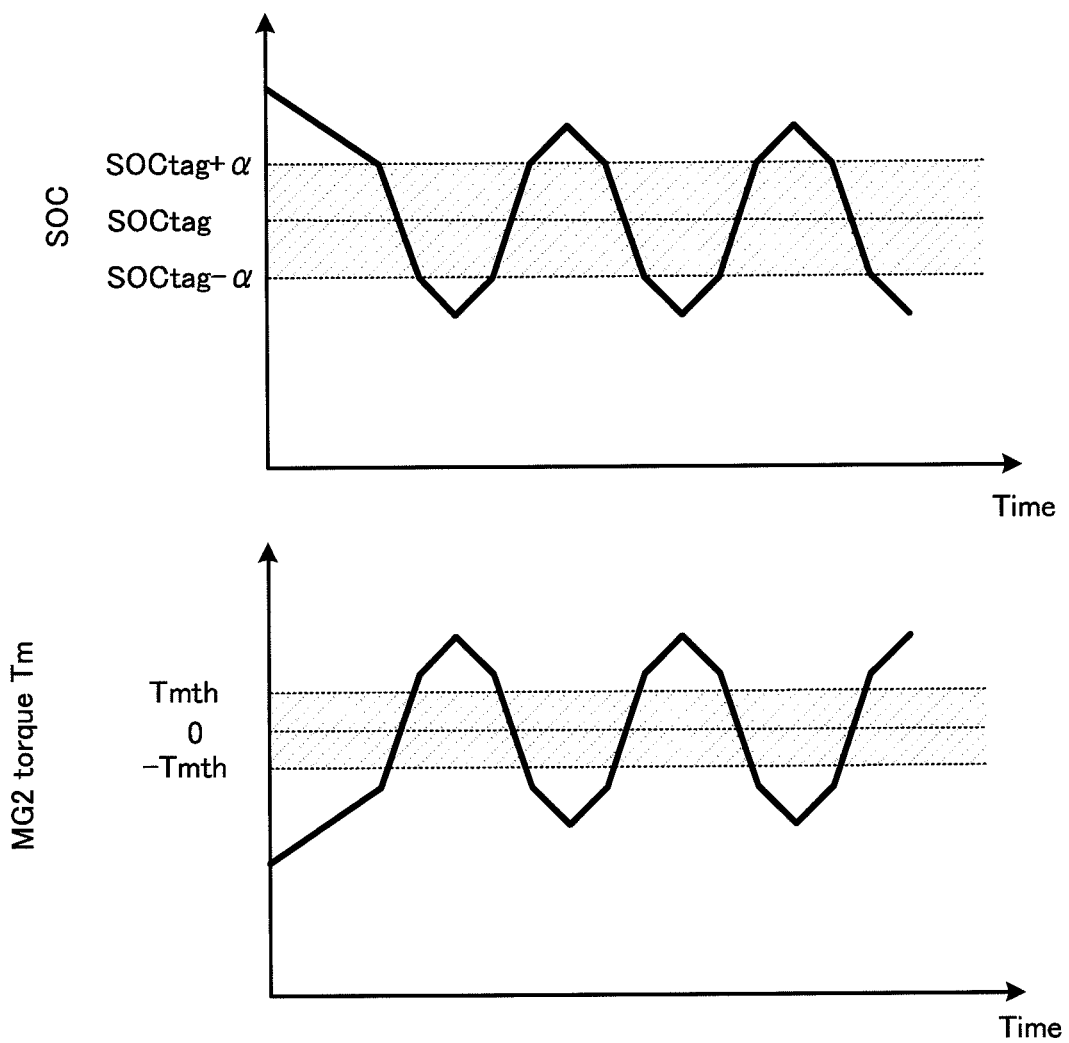
FIG. 9 is a schematic diagram exemplifying one time transition of the SOC of a battery and the MG torque Tm in the process of performing the rattle suppression control in FIG. 4.

Next, with reference to FIG. 9, another effect of the rattle suppression control of the present invention will be explained. FIG. 9 is a schematic diagram exemplifying one time transition of the SOC of the battery and the MG torque Tm in the process of performing the rattle suppression control. Incidentally, FIG. 9 shows the time transmission corresponding to the process in the step S104 in FIG. 4.

FIG. 9 shows a case where the target value of the MG2 torque for maintaining the reference value of the SOC, SOCtag, in the reference range (the range defined by SOCtag+α and SOCtag−α) is in the avoidance area (refer to a hatched area between the illustrated Tmth and −Tmth). In this case, according to the rattle suppression control in the embodiment, the MG2 torque Tm gently changes between the positive torque area and the negative torque area between which there is the avoidance area. Moreover, in the process of the change, if the MG2 torque Tm crosses the avoidance area, the crossover time is reduced by the same rattle suppression process as described above. Therefore, the occurrence of the rattle can be suppressed as much as possible.

Further to that, if no measure is taken that is similar to the rattle suppression control of the present invention, the crossover time (i.e. one example of the reference time) as the time that the MG2 torque Tm crosses the avoidance area can be regarded as the whole area of the illustrated time area. As opposed to that, if the charge and discharge of the battery 12 are gently repeated as shown by an illustrated solid line, the crossover time is limited to a finite time range in which the MG2 torque Tm remains in the avoidance area. Therefore, the crossover time is preferably reduced, and the drivability is remarkably improved. Moreover, in addition to that, by reducing the crossover time in the rattle suppression process as illustrated, it is possible to reduce the crossover time more effectively.

<Second Embodiment>

Figure 10:
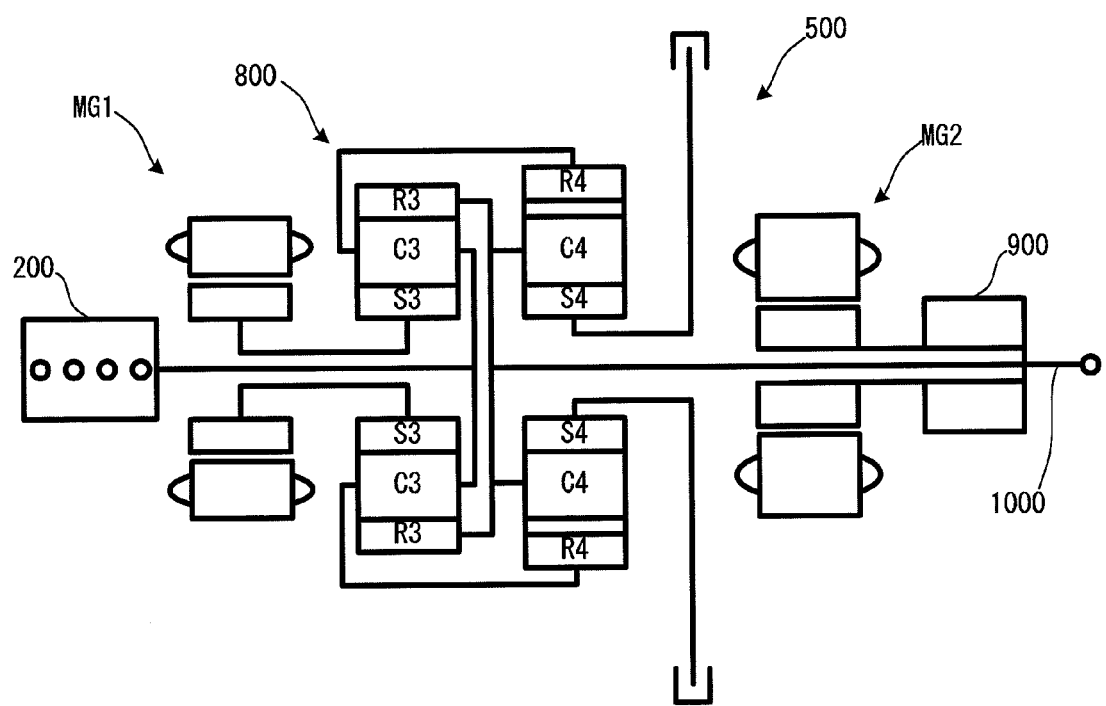
FIG. 10 is a schematic configuration diagram conceptually showing the structure of another hybrid drive apparatus in a second embodiment of the present invention.

The aspect of the power transmission mechanism of the present invention is not limited to the one exemplified in FIG. 2. Now, with reference to FIG. 10, an explanation will be given on the structure of a hybrid drive apparatus 20 in a second embodiment of the present invention. FIG. 10 is a schematic configuration diagram conceptually showing the structure of the hybrid drive apparatus 20. Incidentally, in FIG. 10, the overlap points with FIG. 2 will carry the same reference numerals, and the explanation thereof will be omitted as occasion demands.

In FIG. 10, the hybrid drive apparatus 20 is different from the hybrid drive apparatus 10 in that it is provided with a power dividing mechanism 800 and a MG2 transmission shift mechanism 900.

The power dividing mechanism 800 is a compound planetary gear mechanism as one example of the "power transmission mechanism" of the present invention in which a first planetary gear mechanism and a second planetary gear mechanism are combined.

The first planetary gear mechanism is provided with: a sun gear S3 disposed in the central part; a ring gear R3 concentrically disposed on the outer circumference of the sun gear S3; a plurality of pinion gears (not illustrated), disposed between the sun gear S3 and the ring gear R3 and revolving around the sun gear S3 on the outer circumference of the sun gear S3 while rotating on its axis; and a carrier C3 for pivotably supporting the rotating shaft of each pinion gear.

The second planetary gear mechanism is provided with: a sun gear S4 disposed in the central part; a ring gear R4 concentrically disposed on the outer circumference of the sun gear S4; a plurality of pinion gears (not illustrated), disposed between the sun gear S4 and the ring gear R4 and revolving around the sun gear S4 on the outer circumference of the sun gear S4 while rotating on its axis; and a carrier C4 for pivotably supporting the rotating shaft of each pinion gear.

On the other hand, the sun gear S4 of the second planetary gear mechanism is coupled with the locking mechanism 500, and the state of the sun gear S4 can be changed selectively between the lock state and the non-lock state by the operation of the locking mechanism 500.

Here, the sun gear S3 is coupled with the rotor of the motor generator MG1 so as to share its rotating shaft, and its rotational speed is equivalent to the rotational speed of the MG1, i.e. the MG1 rotational speed Nmg1. Moreover, the ring gear R3 is coupled with the rotor of the motor generator MG2 via a drive shaft 1000 and the MG2 transmission shift mechanism 900, and its rotational speed is equivalent to the aforementioned output rotational speed Nout. Moreover, the carrier C3 is coupled with the input shaft which is coupled with the crank shaft of the engine 200, and its rotational speed is equivalent to the engine rotational speed NE of the engine 200.

The MG2 transmission shift mechanism 900 is a multistage or multistep transmission shift mechanism interposed between the drive shaft 1000 and the motor generator MG2. The MG2 transmission shift mechanism 900 can change a rotational speed ratio between the drive shaft 1000 and the motor generator MG2 in accordance with the gear ratio of a transmission shift stage selected at that time point.

By virtue of such construction, if the sun gear S4 is in the lock state (the lock state referred to as a so-called O/D lock), the fixed speed change mode is selected as the speed change mode, and if the sun gear S4 is in the non-lock state, the stepless speed change mode is selected as the speed change mode.

Even for the hybrid drive apparatus 20 having such a structure, the practical effect associated with the rattle suppression control described above is ensured.

<Third Embodiment>

Figure 11:
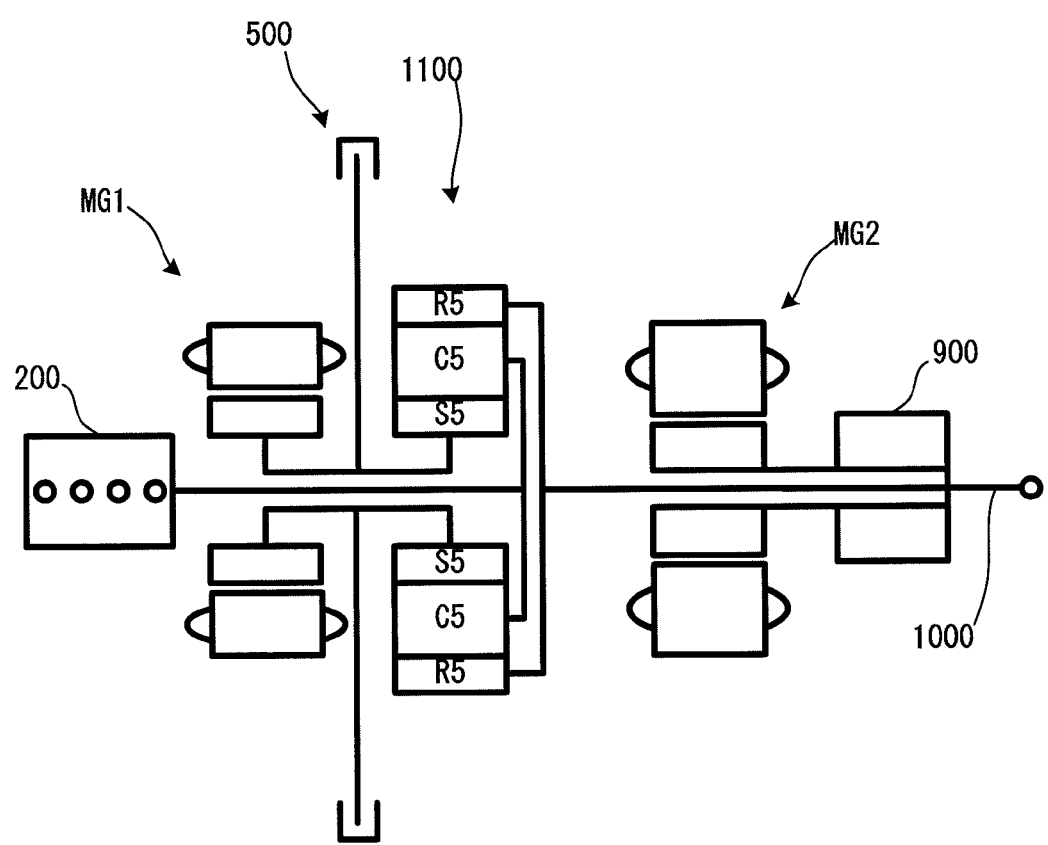
FIG. 11 is a schematic configuration diagram conceptually showing the structure of another hybrid drive apparatus in a third embodiment of the present invention.

The aspect of the power transmission mechanism of the present invention is not limited to the ones exemplified in FIG. 2 and FIG. 10. Now, with reference to FIG. 11, an explanation will be given on the structure of a hybrid drive apparatus 30 in a third embodiment of the present invention. FIG. 11 is a schematic configuration diagram conceptually showing the structure of the hybrid drive apparatus 30. Incidentally, in FIG. 11, the overlap points with FIG. 10 will carry the same reference numerals, and the explanation thereof will be omitted as occasion demands.

In FIG. 11, the hybrid drive apparatus 30 is different from the hybrid drive apparatus 20 in that it is provided with a power dividing mechanism 1100.

The power dividing mechanism 1100 is provided with: a sun gear S5 disposed in the central part; a ring gear R5 concentrically disposed on the outer circumference of the sun gear S5; a plurality of pinion gears (not illustrated), disposed between the sun gear S5 and the ring gear R5 and revolving around the sun gear S5 on the outer circumference of the sun gear S5 while rotating on its axis; and a carrier C5 for pivotably supporting the rotating shaft of each pinion gear.

Here, the MG1, the MG2 and the engine 200 are coupled with the sun gear S5, the ring gear R5 and the carrier C5, respectively. By virtue of the differential operation of each of the gears, the stepless speed change mode is preferably realized if the sun gear S5 is in the non-lock state. On the other hand, if the sun gear S5 is in the lock state, a lock form referred to as the MG1 lock as in the hybrid drive apparatus 10 is realized, and the fixed speed change mode is realized.

Even for the hybrid drive apparatus 30 having such a structure, the practical effect associated with the rattle suppression control described above is ensured.

The present invention is not limited to the aforementioned embodiments, but various changes may be made, if desired, without departing from the essence or spirit of the invention which can be read from the claims and the entire specification. A hybrid vehicle control apparatus, which involves such changes, is also intended to be within the technical scope of the present invention.

Industrial Applicability

The present invention can be applied to a hybrid vehicle in which a speed change mode can be changed between a stepless speed change mode and a fixed speed change mode.

Description of Reference Codes

1 hybrid vehicle
10 hybrid drive apparatus
100 ECU
200 engine
300 power dividing mechanism
400 input shaft
500 locking mechanism
600 MG2 reduction mechanism
700 reduction gear mechanism
800 power dividing mechanism
900 MG2 transmission shift mechanism
1000 drive shaft
1100 power dividing mechanism

The invention claimed is:

1. A hybrid vehicle control apparatus comprising:
   an internal combustion engine;
   a rotating electrical machine;
   a storage battery device which can supply an electric power to said rotating electrical machine and which can be charged by a regenerative electric power of said rotating electrical machine; and
   a power transmission mechanism which comprises a plurality of rotational elements each having a play in its rotational direction and which can transmit a torque between a drive shaft coupled with an axle and said internal combustion engine or said rotating electrical machine,
   said hybrid vehicle control apparatus including:
   a judging device for judging whether or not an input/output torque of said rotating electrical machine to the drive shaft crosses an avoidance area, which is set as generating a rattle caused by the play in said power transmission mechanism in a process that the input/output torque converges to a target torque; and
   a reducing device for reducing a crossover time as a time required for the input/output torque crossing the avoidance area in a case where the input/output torque is judged to cross the avoidance area, with respect to a reference time as a time required for the input/output torque crossing a torque area corresponding to the avoidance area in a case where the input/output torque does not cross the avoidance area.

2. The hybrid vehicle control apparatus according to claim 1, further comprising a controlling device for cooperatively controlling the input/output torque and an engine torque supplied from said internal combustion engine so as to maintain a driver request torque required for the drive shaft.

3. The hybrid vehicle control apparatus according to claim 1, wherein
   the target torque is set in accordance with a reference deviation such that the magnitude of the reference deviation corresponds to the magnitude of the target torque, the reference deviation being a deviation between quantity of state corresponding to a storage state of said storage battery device and a reference value of the quantity of state, and
   said reducing device reduces the crossover time by temporarily stopping setting of the target torque according to the reference deviation and by maintaining the input/output torque in a torque area outside the avoidance area to increase the reference deviation.

4. The hybrid vehicle control apparatus according to claim 3, wherein said reducing device restarts the setting of the target torque according to the reference deviation after the reference deviation increases.

5. The hybrid vehicle control apparatus according to claim 4, wherein said reducing device restarts the setting of the target torque according to the reference deviation if the crossover time is less than a predetermined value in a case where the setting of the target torque according to the reference deviation is restarted.

6. The hybrid vehicle control apparatus according to claim 1, wherein said reducing device reduces a time for the input/ output torque remaining in the avoidance area by repeatedly setting the target torque between a positive torque area and a negative torque area between which there is the avoidance area if the target torque is in the avoidance area, and said reducing device reduces the crossover time in crossing the avoidance area in a process that the input/output torque converges to the repeatedly set target torque.

7. The hybrid vehicle control apparatus according to claim 1, wherein the hybrid vehicle further comprises a locking device capable of selectively changing a state of one rotational element of the plurality of rotational elements between a non-rotatable lock state and a rotatable non-lock state, the hybrid vehicle can change a speed change mode between a stepless speed change mode and a fixed speed change mode, the stepless speed change mode corresponding to the non-lock state in which a transmission gear ratio which is a ratio between a rotational speed of said internal combustion engine and a rotational speed of the drive shaft is continuously variable, the fixed speed change mode corresponding to the lock state in which the transmission gear ratio is fixed, said judging device judges whether or not the input/output toque crosses the avoidance area during a change in the speed change mode, and said reducing device reduces the crossover time if it is judged that the input/output toque crosses the avoidance area during the change in the speed change mode.

\* \* \* \* \*